US012621814B2

(12) United States Patent
Lin et al.

(10) Patent No.: US 12,621,814 B2
(45) Date of Patent: May 5, 2026

(54) BANDWIDTH PART OPERATION IN A WIRELESS COMMUNICATION NETWORK

(71) Applicant: Telefonaktiebolaget LM Ericsson (publ), Stockholm (SE)

(72) Inventors: Xingqin Lin, San José, CA (US); Olof Liberg, Enskede (SE); Helka-Liina Määttänen, Helsinki (FI); Jonas Sedin, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 477 days.

(21) Appl. No.: 17/909,782

(22) PCT Filed: Mar. 4, 2021

(86) PCT No.: PCT/SE2021/050196
§ 371 (c)(1),
(2) Date: Sep. 7, 2022

(87) PCT Pub. No.: WO2021/183026
PCT Pub. Date: Sep. 16, 2021

(65) Prior Publication Data
US 2023/0119744 A1     Apr. 20, 2023

Related U.S. Application Data

(60) Provisional application No. 62/988,528, filed on Mar. 12, 2020.

(51) Int. Cl.
*H04W 72/0453* (2023.01)
*H04W 72/23* (2023.01)
(Continued)

(52) U.S. Cl.
CPC ....... *H04W 72/0453* (2013.01); *H04W 72/23* (2023.01); *H04W 74/0833* (2013.01); *H04W 76/27* (2018.02)

(58) Field of Classification Search
CPC ............. H04W 72/0453; H04W 72/23; H04W 74/0833; H04W 48/12; H04W 74/006;
(Continued)

(56) References Cited

U.S. PATENT DOCUMENTS

2019/0045549 A1     2/2019   Wu
2019/0246442 A1 *   8/2019   Park ...................... H04W 76/18
(Continued)

FOREIGN PATENT DOCUMENTS

WO      WO-2019095205 A1 *   5/2019   ............ H04W 48/16

OTHER PUBLICATIONS

"3GPP TR 38.811 V15.2.0", 3rd Generation Partnership Project; Technical Specification Group Radio Access Network; Study on New Radio (NR) to support non-terrestrial networks (Release 15), Sep. 2019, pp. 1-126.
"3rd Generation Partnership Project; Technical Specification Group Radio Access Network; NR; User Equipment (UE) procedures in Idle mode and RRC Inactive state (Release 15)", 3GPP TS 38.304 V15.6.0, Dec. 2019, 30 pages.
(Continued)

*Primary Examiner* — Vinncelas Louis
(74) *Attorney, Agent, or Firm* — Murphy, Bilak & Homiller, PLLC

(57) ABSTRACT

A wireless device (18) is configured for use in a wireless communication network (10). The wireless device (18) receives broadcasted system information (20) for a cell (14). The broadcasted system information (20) indicates multiple bandwidth parts (16-1, 16-2 . . . 16-N) of the cell (14), where the multiple bandwidth parts (16-1, 16-2, . . . 16-N) indicated are either multiple downlink bandwidth parts or multiple uplink bandwidth parts. Alternatively or additionally, the broadcasted system information (20) indicates respective frequency positions of multiple synchronization signal blocks, SSBs, for the cell (14).

3 Claims, 23 Drawing Sheets

(51) Int. Cl.
 *H04W 74/0833* (2024.01)
 *H04W 76/27* (2018.01)

(58) Field of Classification Search
 CPC . H04W 74/0808; H04W 76/19; H04W 76/27;
 H04W 76/18; H04W 72/02; H04L
 5/0053; H04L 5/001; H04L 5/0092; H04B
 7/0695
 See application file for complete search history.

(56) References Cited

U.S. PATENT DOCUMENTS

| | | | |
|---|---|---|---|
| 2019/0305916 A1* | 10/2019 | Liao | H04L 5/0092 |
| 2019/0357262 A1* | 11/2019 | Cirik | H04L 5/001 |
| 2020/0245304 A1* | 7/2020 | Nam | H04L 5/0078 |
| 2020/0288507 A1* | 9/2020 | Chang | H04W 74/0833 |
| 2021/0399821 A1* | 12/2021 | Chung | H04L 5/14 |
| 2022/0182986 A1* | 6/2022 | Chen | H04W 72/02 |
| 2022/0264589 A1* | 8/2022 | Sun | H04W 74/0833 |

OTHER PUBLICATIONS

"New Study WID on NB-IoT/eTMC support for NTN", 3GPP TSG RAN Meeting #86, RP-193235, MediaTek Inc., Sitges, Spain, Dec. 9-31, 2019, 4 pages.
3GPP , "3GPP TR 38.821 V16.0.0", 3rd Generation Partnership Project; Technical Specification Group Radio Access Network; Solutions for NR to support non-terrestrial networks (NTN) (Release 16), Dec. 2019, 1-140.
Albulet, Mihai , "Spacex V-Band Non-Geostationary Satellite System", Attachment A, Technical Information to Supplement Schedule S, Space Exploration Technologies Corp., Mar. 1, 2017, 60 pages.
Barnett, Richard J, "Oneweb Non-Geostationary Satellite System (Leo)", Attachment A, Technical Information to Supplement Schedule S, Telecomm Strategies LLP, Apr. 2016, 18 pages.
Thales , "Solutions for NR to support non-terrestrial networks (NTN)", 3GPP TSG RAN meeting #86, RP-193234, revision from RP-192502, 3144, Sitges, Spain, Dec. 9-13, 2019, 1-10.

* cited by examiner

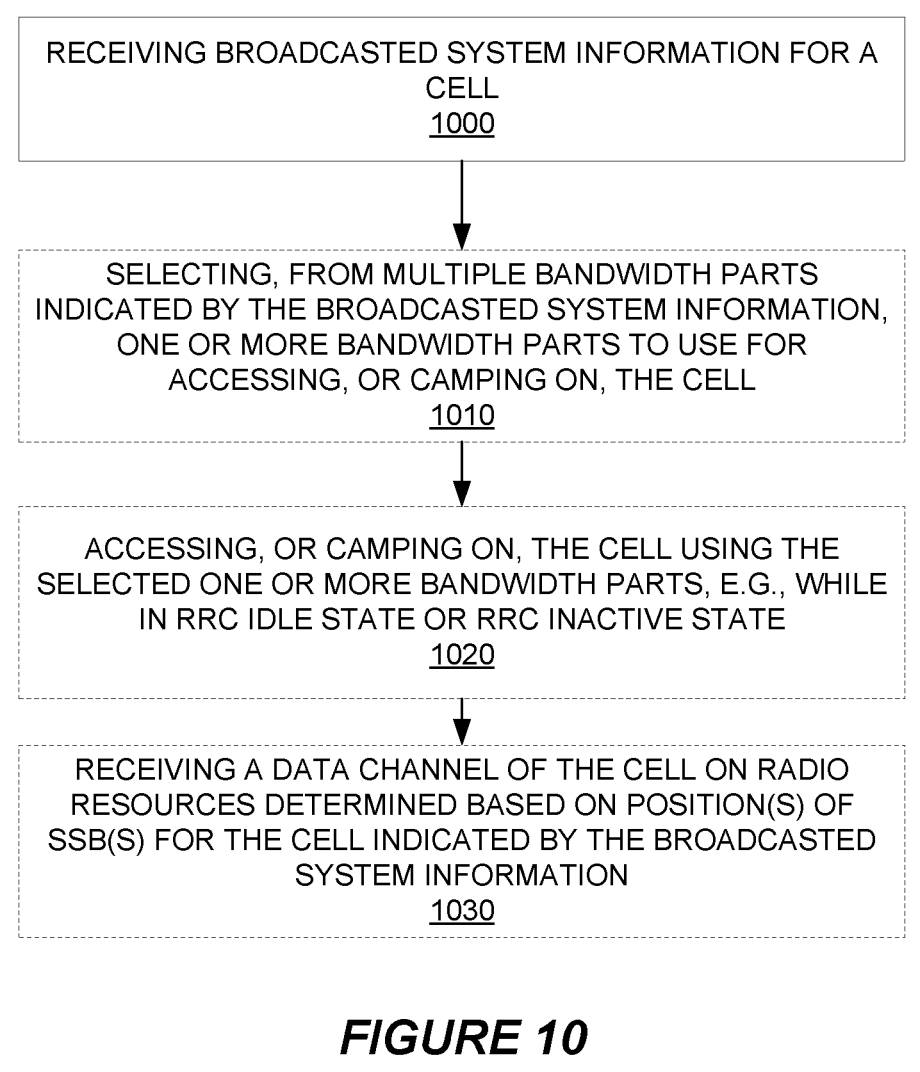

RECEIVING BROADCASTED SYSTEM INFORMATION FOR A
CELL
1000

SELECTING, FROM MULTIPLE BANDWIDTH PARTS
INDICATED BY THE BROADCASTED SYSTEM INFORMATION,
ONE OR MORE BANDWIDTH PARTS TO USE FOR
ACCESSING, OR CAMPING ON, THE CELL
1010

ACCESSING, OR CAMPING ON, THE CELL USING THE
SELECTED ONE OR MORE BANDWIDTH PARTS, E.G., WHILE
IN RRC IDLE STATE OR RRC INACTIVE STATE
1020

RECEIVING A DATA CHANNEL OF THE CELL ON RADIO
RESOURCES DETERMINED BASED ON POSITION(S) OF
SSB(S) FOR THE CELL INDICATED BY THE BROADCASTED
SYSTEM INFORMATION
1030

*FIGURE 10*

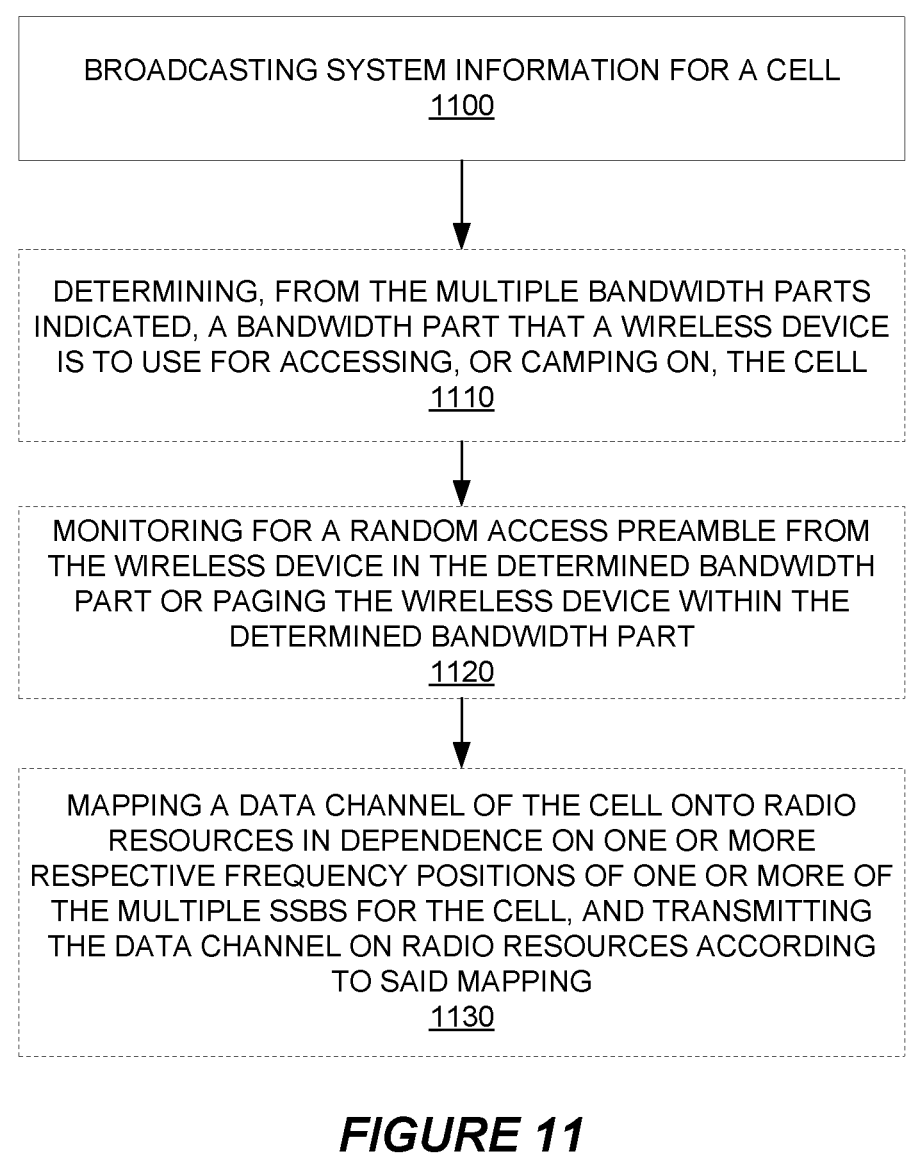

BROADCASTING SYSTEM INFORMATION FOR A CELL
1100

DETERMINING, FROM THE MULTIPLE BANDWIDTH PARTS INDICATED, A BANDWIDTH PART THAT A WIRELESS DEVICE IS TO USE FOR ACCESSING, OR CAMPING ON, THE CELL
1110

MONITORING FOR A RANDOM ACCESS PREAMBLE FROM THE WIRELESS DEVICE IN THE DETERMINED BANDWIDTH PART OR PAGING THE WIRELESS DEVICE WITHIN THE DETERMINED BANDWIDTH PART
1120

MAPPING A DATA CHANNEL OF THE CELL ONTO RADIO RESOURCES IN DEPENDENCE ON ONE OR MORE RESPECTIVE FREQUENCY POSITIONS OF ONE OR MORE OF THE MULTIPLE SSBS FOR THE CELL, AND TRANSMITTING THE DATA CHANNEL ON RADIO RESOURCES ACCORDING TO SAID MAPPING
1130

*FIGURE 11*

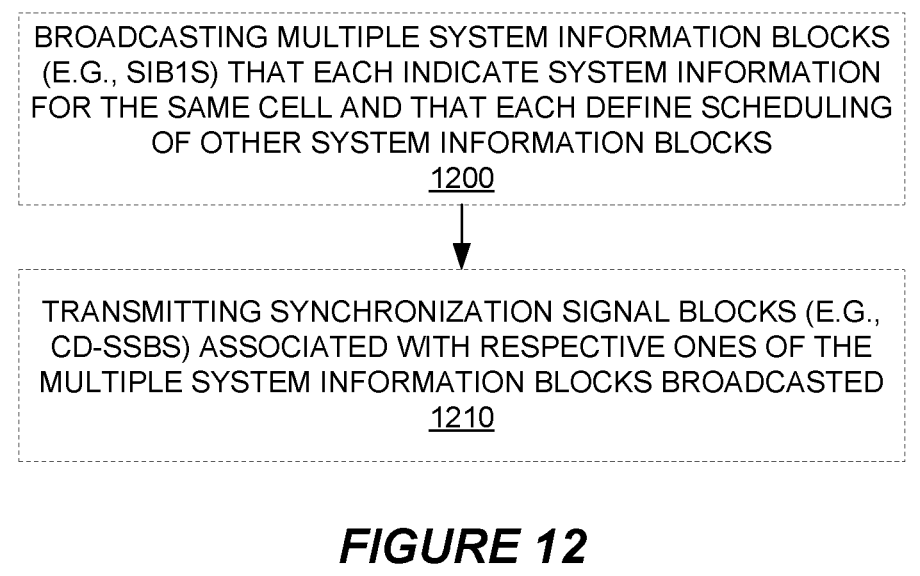

BROADCASTING MULTIPLE SYSTEM INFORMATION BLOCKS (E.G., SIB1S) THAT EACH INDICATE SYSTEM INFORMATION FOR THE SAME CELL AND THAT EACH DEFINE SCHEDULING OF OTHER SYSTEM INFORMATION BLOCKS
1200

TRANSMITTING SYNCHRONIZATION SIGNAL BLOCKS (E.G., CD-SSBS) ASSOCIATED WITH RESPECTIVE ONES OF THE MULTIPLE SYSTEM INFORMATION BLOCKS BROADCASTED
1210

*FIGURE 12*

BANDWIDTH PART OPERATION IN A WIRELESS COMMUNICATION NETWORK

TECHNICAL FIELD

The present application relates generally to a wireless communication network and relates more particularly to bandwidth part operation in such a network.

BACKGROUND

In some wireless communication networks, such as those based on New Radio (NR), the receive and/or transmit bandwidth of a wireless device need not be as large as the bandwidth of a cell. Rather, the wireless device can use a receive and/or transmit bandwidth that is just a subset of the total cell bandwidth of the cell. In this regard, a subset of the total cell bandwidth of a cell is referred to herein as a bandwidth part (BWP). Allowing a wireless device to use just a part of the total cell bandwidth in this way creates flexibility in how the total cell bandwidth can be used. However, bandwidth part operation heretofore requires all wireless devices (e.g., in a radio resource control, RRC, idle state) to initially access and camp on the cell using the same BWP. This bottleneck in turn threatens to limit system capacity, especially for non-terrestrial networks (NTNs) whose cells cover large areas. Moreover, while reusing frequencies on a bandwidth part basis may improve signal quality and facilitate mobility management, it complicates data channel transmission and reception.

SUMMARY

According to some embodiments herein, a radio network node informs a wireless device about multiple bandwidth parts (BWPs) of a cell, e.g., multiple downlink BWPs of the cell or multiple uplink BWPs of the cell. The radio network node may for example broadcast system information indicating the multiple BWPs of the cell. In these and other embodiments, then, the wireless device may be informed about the multiple BWPs even in advance of the wireless device accessing, or camping on, the cell, e.g., from a radio resource control (RRC) idle state or an RRC inactive state. This way, rather than only a single BWP being available to the wireless device for accessing or camping on the cell, multiple BWPs are made available in this regard as options for the wireless device to select between. Some embodiments accordingly control or configure wireless device BWP selection so that at least some wireless devices select different BWPs for accessing or camping on the cell, e.g., from RRC idle or RRC inactive. This distributes loading attributable to access and camping across multiple BWPs of the cell so as to advantageously alleviate bottlenecking and increase system capacity. Such may prove particularly advantageous in embodiments where the cell is in a non-terrestrial network (NTN) or otherwise has a large coverage area.

According to other embodiments herein, a radio network node alternatively or additionally informs a wireless device about the respective frequency positions of multiple synchronization signal blocks (SSBs) for a cell. Signaling the respective frequency positions of the multiple SSBs for the cell in this way may advantageously enable adaptive use of BWPs for frequency reuse planning, e.g., based on traffic demand. Indeed, in these and other embodiments, SSBs may be flexibly positioned as needed so that any given BWP may have zero, one, or more SSBs included therein, or even have a fraction of an SSB included therein. Rate matching may then be employed for data channel transmissions, to account for potentially multiple SSBs being positioned within the operating bandwidth of the wireless device, e.g., in the form of a selected BWP from among multiple BWPs. Some embodiments may thereby advantageously enable adaptive use of BWPs for frequency reuse planning, while preserving data channel performance.

Generally, then, embodiments herein include a method performed by a wireless device configured for use in a wireless communication network. The method may comprise receiving broadcasted system information for a cell. The broadcasted system information indicates at least one of any one or more of: (i) multiple bandwidth parts of the cell; and (ii) respective frequency positions of multiple synchronization signal blocks (SSBs) for the cell.

In embodiments where the broadcasted system information indicates multiple bandwidth parts of the cell, the multiple bandwidth parts indicated may be either multiple downlink bandwidth parts or multiple uplink bandwidth parts. In some embodiments, the multiple bandwidth parts indicated are each usable by the wireless device to access, or camp on, the cell, e.g., in a Radio Resource Control, RRC, idle state or an RRC inactive state. In this case, the method may further comprise selecting, from the multiple bandwidth parts indicated, one or more bandwidth parts to use for accessing, or camping on, the cell. Alternatively or additionally, the method may further comprise accessing, or camping on, the cell using one or more of the multiple bandwidth parts indicated, e.g., from an RRC idle state or an RRC inactive state.

Accordingly, in some embodiments, the broadcasted system information indicates the multiple bandwidth parts of the cell.

In some embodiments, the multiple bandwidth parts indicated are each usable by the wireless device to access, or camp on, the cell. In this case, the method may further comprise accessing, or camping on, the cell using one or more of the multiple bandwidth parts indicated. In one or more of these embodiments, accessing the cell using one or more of the multiple bandwidth parts indicated comprises transmitting or receiving one or more messages of a random access procedure in one or more of the multiple bandwidth parts indicated. Alternatively or additionally, camping on the cell using one or more of the multiple bandwidth parts indicated may comprise monitoring a paging channel in one or more of the multiple bandwidth parts indicated.

In some embodiments, the method further comprises selecting, from the multiple bandwidth parts indicated, one or more bandwidth parts to use for accessing, or camping on, the cell. In one such embodiment, selecting one or more bandwidth parts comprises selecting, from the multiple bandwidth parts indicated, one or more bandwidth parts based on an identity which identifies the wireless device or a subscriber associated with the wireless device and/or based on signal measurements performed by the wireless device on signals received in respective ones of the multiple bandwidth parts indicated.

In some embodiments, the method further comprises selecting, from the multiple bandwidth parts indicated, one or more bandwidth parts to use for accessing, or camping on, the cell. In one such embodiment, selecting one or more bandwidth parts comprises randomly selecting one or more bandwidth parts from the multiple bandwidth parts indicated according to a probability distribution indicated by the broadcasted system information.

In some embodiments, for at least one of the multiple bandwidth parts indicated, one portion of configuration parameters for the bandwidth part is indicated by the broadcasted system information and another portion of configuration parameters for the bandwidth part is received by the wireless device on a downlink channel in the bandwidth part. In other embodiments, one portion of configuration parameters for the bandwidth part is either indicated by the broadcasted system information or is received by the wireless device on a downlink channel in the bandwidth part, and another portion of configuration parameters for the bandwidth part is derived by the wireless device from configuration parameters for another bandwidth part.

In some embodiments, the multiple bandwidth parts are each usable by the wireless device to perform one or more operations in a Radio Resource Control, RRC, idle state or an RRC inactive state. In one such embodiment, the method further comprises, while the wireless device is in a Radio Resource Control, RRC, idle state or an RRC inactive state, performing one or more operations using one or more of the multiple bandwidth parts of the cell.

In some embodiments, the broadcasted system information indicates multiple downlink bandwidth parts and multiple uplink bandwidth parts. In one such embodiment, broadcasted system information indicates selectable bandwidth part pairs, with each bandwidth part pair including one of the multiple downlink bandwidth parts and one of the multiple uplink bandwidth parts. In this case, the method may further comprise selecting one of the selectable bandwidth part pairs to use for accessing, or camping on, the cell.

In some embodiments, the broadcasted system information includes a System Information Block 1 (SIB1) that indicates the at least one of any one or more of the multiple bandwidth parts of the cell and the respective frequency positions of multiple SSBs for the cell.

In some embodiments, the wireless communication network is or includes a non-terrestrial network.

In some embodiments, the broadcasted system information indicates a first polarization mode for a first bandwidth part of the multiple bandwidth parts of the cell and a second polarization mode for a second bandwidth part of the multiple bandwidth parts of the cell.

In some embodiments, the broadcasted system information indicates respective frequency positions of multiple SSBs for the cell. In one or more of these embodiments, the method further comprises determining, based on the one or more respective positions of one or more of the multiple SSBs for the cell, radio resources on which to receive a data channel of the cell and receiving the data channel on radio resources according to said determining.

In some embodiments, at least two of the multiple SSBs for the cell are cell-defining SSBs.

Embodiments herein also include a corresponding method performed by a radio network node configured for use in a wireless communication network. The method comprises broadcasting system information for a cell. The broadcasted system information indicates at least one of any one or more of: (i) multiple bandwidth parts of the cell; and (ii) respective frequency positions of multiple synchronization signal blocks (SSBs) for the cell.

In embodiments where the broadcasted system information indicates multiple bandwidth parts of the cell, the multiple bandwidth parts indicated may be either multiple downlink bandwidth parts or multiple uplink bandwidth parts. In some embodiments, the method may further comprise using one or more of the multiple bandwidth parts indicated to serve a wireless device.

In some embodiments, the broadcasted system information indicates the multiple bandwidth parts of the cell. In one or more of these embodiments, the multiple bandwidth parts indicated are each usable by a wireless device to access, or camp on, the cell. In one or more of these embodiments, the method further comprises transmitting or receiving one or more messages of a random access procedure in each of the multiple bandwidth parts indicated. Additionally or alternatively, the method further comprises paging the same wireless device within each of the multiple bandwidth parts indicated.

In some embodiments, the system information indicates a probability distribution according to which the wireless device is to randomly select, from the multiple bandwidth parts indicated, one or more bandwidth parts to use for accessing, or camping on, the cell.

In some embodiments, for at least one of the multiple bandwidth parts indicated one portion of configuration parameters for the bandwidth part is indicated by the broadcasted system information and another portion of configuration parameters for the bandwidth part is transmitted on a downlink channel in the bandwidth part. In other embodiments, one portion of configuration parameters for the bandwidth part is either indicated by the broadcasted system information or is transmitted on a downlink channel in the bandwidth part, and another portion of configuration parameters for the bandwidth part is derivable from configuration parameters for another bandwidth part.

In some embodiments, the broadcasted system information indicates multiple downlink bandwidth parts and multiple uplink bandwidth parts. In one such embodiment, the broadcasted system information indicates selectable bandwidth part pairs, with each bandwidth part pair including one of the multiple downlink bandwidth parts and one of the multiple uplink bandwidth parts.

In some embodiments, the broadcasted system information includes a System Information Block 1 (SIB1) that indicates the at least one of any one or more of the multiple bandwidth parts of the cell and the respective frequency positions of multiple SSBs for the cell.

In some embodiments, the wireless communication network is or includes a non-terrestrial network.

In some embodiments, the broadcasted system information indicates a first polarization mode for a first bandwidth part of the multiple bandwidth parts of the cell and a second polarization mode for a second bandwidth part of the multiple bandwidth parts of the cell.

In some embodiments, the broadcasted system information indicates respective frequency positions of multiple SSBs for the cell. In one or more of these embodiments, the method further comprises mapping a data channel of the cell onto radio resources in dependence on one or more respective frequency positions of one or more of the multiple SSBs for the cell, and transmitting the data channel on radio resources according to said mapping.

In some embodiments, the multiple bandwidth parts indicated are multiple uplink bandwidth parts. In one such embodiment, the method further comprises monitoring each of two or more of the multiple uplink bandwidth parts for a random access preamble from a wireless device.

In some embodiments, the method further comprises determining, from the multiple bandwidth parts indicated, a bandwidth part that a wireless device is to use for accessing, or camping on, the cell. In this case, determining the bandwidth part may be performed based on an identity which identifies the wireless device or a subscriber associated with the wireless device.

In some embodiments, the multiple bandwidth parts indicated are multiple downlink bandwidth parts. In this case, determining the bandwidth part may comprise determining, from the multiple downlink bandwidth parts, a downlink bandwidth part that the wireless device is to use for camping on the cell. In this case, the method further comprises paging the wireless device within the determined downlink bandwidth part.

In some embodiments, at least two of the multiple SSBs for the cell are cell-defining SSBs.

Embodiments herein may further include a method performed by a radio network node configured for use in a wireless communication network. The method comprises broadcasting multiple system information blocks (e.g., multiple type 1 system information blocks, SIB1s) that each indicate system information for the same cell and that each define scheduling of other system information blocks. In some embodiments, the multiple system information blocks are broadcasted at different frequency positions within the same carrier. The method may in some embodiments further comprise transmitting synchronization signal blocks (SSBs). The SSBs may be associated with respective ones of the multiple system information blocks broadcasted and/or indicate parameters (e.g., control resource sets) for receiving respective ones of the multiple system information blocks broadcasted.

In some embodiments, at least two or more of the multiple system information blocks are broadcasted in different downlink bandwidth parts of the cell.

In some embodiments, the method further comprises performing, in each of the different downlink bandwidth parts of the cell, random access procedures for wireless devices to access the cell from a Radio Resource Control, RRC, idle state or an RRC inactive state. Additionally or alternatively, the method further comprises transmitting, in each of the different downlink bandwidth parts of the cell, paging messages to wireless devices in a Radio Resource Control, RRC, idle state or an RRC inactive state.

In some embodiments, the system information blocks broadcasted are each a System Information Block 1 (SIB1).

In some embodiments, the wireless communication network is or includes a non-terrestrial network.

Other embodiments herein include a wireless device configured for use in a wireless communication network. The wireless device is configured to receive broadcasted system information for a cell. The broadcasted system information indicates at least one of any one or more of multiple bandwidth parts of the cell, wherein the multiple bandwidth parts indicated are either multiple downlink bandwidth parts or multiple uplink bandwidth parts, and respective frequency positions of multiple synchronization signal blocks, SSBs, for the cell.

In some embodiments, the wireless device is configured to perform the steps described above for a wireless device.

Other embodiments herein include a radio network node configured for use in a wireless communication network. The radio network node is configured to broadcast system information for a cell. The broadcasted system information indicates at least one of any one or more of multiple bandwidth parts of the cell, wherein the multiple bandwidth parts indicated are either multiple downlink bandwidth parts or multiple uplink bandwidth parts, and respective frequency positions of multiple synchronization signal blocks, SSBs, for the cell.

In some embodiments, the radio network node is configured to perform the steps described above for a radio network node.

Other embodiments herein include a radio network node configured for use in a wireless communication network. The radio network node is configured to broadcast multiple system information blocks that each indicate system information for the same cell and that each define scheduling of other system information blocks.

In some embodiments, the radio network node is configured to perform the steps described above for a radio network node.

Other embodiments herein include a computer program comprising instructions which, when executed by at least one processor of a wireless device, causes the wireless device to carry out the steps described above for a wireless device. Other embodiments herein include a computer program comprising instructions which, when executed by at least one processor of a radio network node, causes the radio network node to carry out the steps described above for a radio network node. In one or more of these embodiments, a carrier containing the computer program described above is one of an electronic signal, optical signal, radio signal, or computer readable storage medium.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIG. 10 is a logic flow diagram of a method performed by a wireless device according to some embodiments.

FIG. 11 is a logic flow diagram of a method performed by a radio network node according to some embodiments.

FIG. 12 is a logic flow diagram of a method performed by a radio network node according to other embodiments.

DETAILED DESCRIPTION

Figure 1:
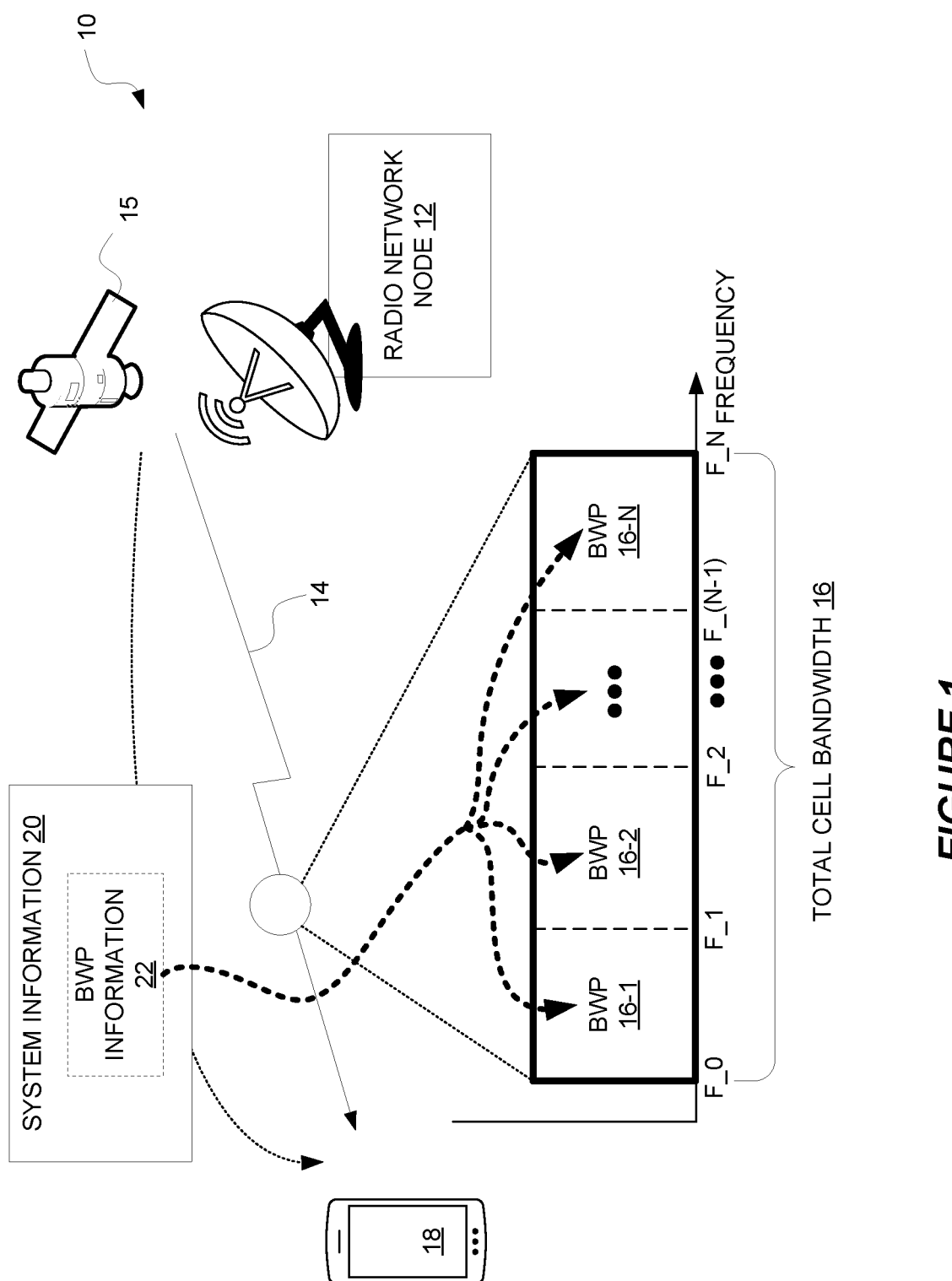
FIG. 1 is a block diagram of a wireless communication network that includes a cell with multiple bandwidth parts according to some embodiments.

FIG. 1 shows a wireless communication network 10 (e.g., a non-terrestrial network, NTN) according to some embodiments. The network 10 includes one or more radio network nodes (e.g., one or more base stations) that each provide one or more cells, potentially in cooperation with one or more satellites. Different cells may be provided on and/or correspond to different radio carriers, which may have respective bandwidths in frequency. As depicted, for example, the network 10 includes a radio network node 12 that provides a cell 14, e.g., in cooperation with one or more satellites 15. The cell 14 may be uniquely identified in the wireless communication network 10 by a cell global identity such as a New Radio Cell Global Identity (NCGI). The total cell bandwidth 16 of the cell 14 spans from frequency F_0 to frequency F_N. The receive and/or transmit bandwidth of a wireless device, however, need not be as large as the total cell bandwidth 16. Rather, a wireless device can use a receive and/or transmit bandwidth that is just a subset of the total cell bandwidth 16 of the cell 14. A subset of the total cell bandwidth 16 of the cell 14 is referred to herein as a bandwidth part (BWP).

According to some embodiments, the radio network node 12 is configured to inform a wireless device 18 about multiple bandwidth parts (BWPs) 16-1, 16-2, . . . 16-N of the cell 14. In some embodiments, the multiple BWPs 16-1, 16-2, . . . 16-N are multiple downlink BWPs, e.g., each dedicated for downlink communication from the radio network node 12 to the wireless device 18. In other embodiments, the multiple BWPs 16-1, 16-2, . . . 16-N are multiple uplink BWPs, e.g., each dedicated for uplink communication from the wireless device 18 to the radio network node 12. In any of the embodiments, though, each of the BWPs 16-1, 16-2, . . . 16-N is a respective subset of the total cell bandwidth 16 of the cell 14, e.g., included within the frequency span of the same carrier. In one such embodiment, each BWP is a contiguous subset of physical resource blocks (PRBs) defined for a given numerology on a given carrier, e.g., where a PRB is 12 consecutive subcarriers in the frequency domain. As shown, for example, BWP 16-1 spans from F_0 to F_1, BWP 16-2 spans from F_1 to F_2, and so on up to BWP 16-N spanning from F_(N−1) to F_N. Although illustrated here as non-overlapping or disjoint, the BWPs 16-1, 16-2, . . . 16-N in other embodiments may at least partially overlap with one another.

No matter the particular nature of the BWPs as being downlink BWPs or uplink BWPs, the radio network node 12 in some embodiments informs the wireless device 18 about those BWPs by broadcasting system information 20 which indicates the multiple BWPs 16-1, 16-2, . . . 16-N of the cell 14. The system information 20 may indicate these multiple BWPs 16-1, 16-2, . . . 16-N even though the system information 20 may be broadcast in only one downlink BWP of the cell 14, e.g., a so-called initial BWP. In some embodiments, the system information 20 is a Master Information Block (MIB) or a System Information Block of Type 1 (SIB1). As shown, for instance, the system information 20 includes BWP information 22 (e.g., in the form of one or more information elements, IEs) which indicates the multiple BWPs 16-1, 16-2, . . . 16-N of the cell 14.

The system information 20 may indicate the multiple BWPs 16-1, 16-2, . . . 16-N in the sense that the system information 20 indicates, for each of the multiple BWPs 16-1, 16-2, . . . 16-N, one or more parameters of that BWP. The one or more parameters of a BWP may include, for instance, an identity or index of the BWP, a location of the BWP in frequency, a bandwidth spanned by the BWP, numerology (e.g., subcarrier spacing, cyclic prefix length, etc. for the BWP), and/or a control resource set for the BWP.

In some embodiments, the system information 20 fully specifies or indicates at least one of the multiple BPWs 16-1, 16-2, . . . 16-N, e.g., by specifying all needed configuration parameters for use. In other embodiments, though, the system information 20 may only partially specify or indicate at least one of the multiple BWPs 16-1, 16-2, . . . 16-N, e.g., by specifying only a portion of the needed configuration parameters for use.

As an example of these latter embodiments, for at least one of the multiple BWPs 16-1, 16-2, . . . 16-N indicated, one portion of configuration parameters for the BWP is indicated by the broadcasted system information 20 and another portion of the configuration parameters for the BWP is indicated on a downlink channel in the BWP itself. The portion of configurations parameters indicated by the broadcasted system information 20 may include for instance an identity of the BWP as well as generic parameters of the BWP such as frequency location and bandwidth, subcarrier spacing, and/or cyclic prefix length. The portion of configuration parameters indicated on a downlink channel in the BWP itself may include additional system information and/or dedicated (i.e., device-specific) parameters.

As another example, for at least one of the multiple BWPs 16-1, 16-2, . . . 16-N indicated, one portion of configuration parameters for the BWP is indicated by the broadcasted system information 20 or is indicated on a downlink channel in the BWP itself, and another portion of configuration parameters for the BWP is derived by the wireless device 18 from configuration parameters for another BWP, e.g., the BWP in which the broadcasted system information 20 is received. Such derivation may be based upon inheritance from the BWP in which the broadcasted system information 20 is received, e.g., one or more configuration parameters for a BWP may be inherited from one or more parameters of a common control resource set configured by the broadcasted system information 20. One exception may be the parameter frequencyDomainResources that configures the frequency domain resource for the common control resource set. Each bit in frequencyDomainResources corresponds to a group of 6 resource blocks, with grouping starting from the first resource block group in BWP #0. In one example, a separate parameter is used to configure the frequency domain resource for the common control resource set used in a BWP other than BWP #0. Alternatively, the frequency domain resource for the common control resource set used in a BWP other than BWP #0 is derived from frequencyDomainResources configured in the system information 2 by assuming that the grouping starts from the first resource block group in that BWP.

In any event, with the system information 20 broadcasted for the cell 14, the information indicating the multiple BWPs 16-1, 16-2, . . . 16-N may be considered cell-specific information, as opposed to device-specific information. The multiple BWPs 16-1, 16-2, . . . 16-N indicated in may thereby represent BWPs that are commonly available to multiple wireless devices, as opposed to being dedicated for a particular wireless device.

In these and other embodiments, then, the wireless device 18 may be informed about the multiple BWPs 16-1, 16-2, . . . 16-N of the cell 14 even in advance of the wireless device 18 accessing, or camping on, the cell 14, e.g., from a radio resource control (RRC) idle state or an RRC inactive state. The multiple BWPs 16-1, 16-2, . . . 16-N indicated may thereby each be usable by the wireless device 18 to access, or camp on, the cell 14, e.g., from an RRC idle state or an RRC inactive state. This way, rather than only a single BWP being available to the wireless device 18 for accessing or camping on the cell 14, multiple BWPs are made available in this regard as options for the wireless device 18 to select between.

In some embodiments, therefore, the wireless device 18 selects, from the multiple BWPs 16-1, 16-2, . . . 16-N indicated, one or more BWPs to use for accessing, or camping on, the cell 14. In one such embodiment, the wireless device 18 randomly selects, from the multiple BWPs 16-1, 16-2, . . . 16-N, one or more BWPs to use for accessing, or camping on, the cell 14. This random selection may be performed according to a certain probability distribution. The probability distribution in one embodiment may specify an equal probability of selection for each of the multiple BWPs 16-1, 16-2, . . . 16-N. In other embodiments, the probability distribution may specify an unequal probability of selection amongst the multiple BWPs 16-1, 16-2, . . . 16-N, e.g., so as to bias selection towards certain BWP(s). In one such embodiment, for instance, the probability distribution may specify a weight $w_n$ to BWP 16-$n$ so that the wireless device 18 selects BWP 16-$n$ with probability $w_n \Sigma_m w_m$. Regardless, in some embodiments, the probability distribution is fixed, e.g., in the sense that it does not change from time to time. In other embodiments, the probability distribution is dynamic, e.g., so as to change from time to time or from circumstance to circumstance. In one embodiment, for example, the system information 20 may indicate the probability distribution to the wireless device 18. This may thereby enable the radio network node 12 to dynamically adapt the probability distribution as needed, e.g., based on estimated load across BWPs.

In other embodiments, the wireless device 18 selects, from the multiple BWPs 16-1, 16-2, . . . 16-N indicated, one or more BWPs based on an identity which identifies the wireless device 18 or a subscriber associated with the wireless device 18. The identity may be an International Mobile Equipment Identity (IMEI), a Subscription Permanent Identity (SUPI) such as an International Mobile Subscriber Identity (IMSI), or the like. Regardless, in embodiments where the multiple BWPs indicated have respective indices (e.g., 1 to N), the wireless device 18 may for example select a BWP with an index n=ID mod N, where ID is the identity which identifies the wireless device 18 or the subscriber associated with the wireless device 18, and where N is a number of the multiple BWPs indicated.

In yet other embodiments, the wireless device 18 selects, from the multiple BWPs 16-1, 16-2, . . . 16-N indicated, one or more BWPs based on signal measurements performed by the wireless device 18 on signals received in respective ones of the multiple BWPs indicated. The wireless device 18 may for example measure the strength of signals received in respective ones of the multiple BWPs indicated and select the BWP that provides the maximum received signal power.

Figure 2:
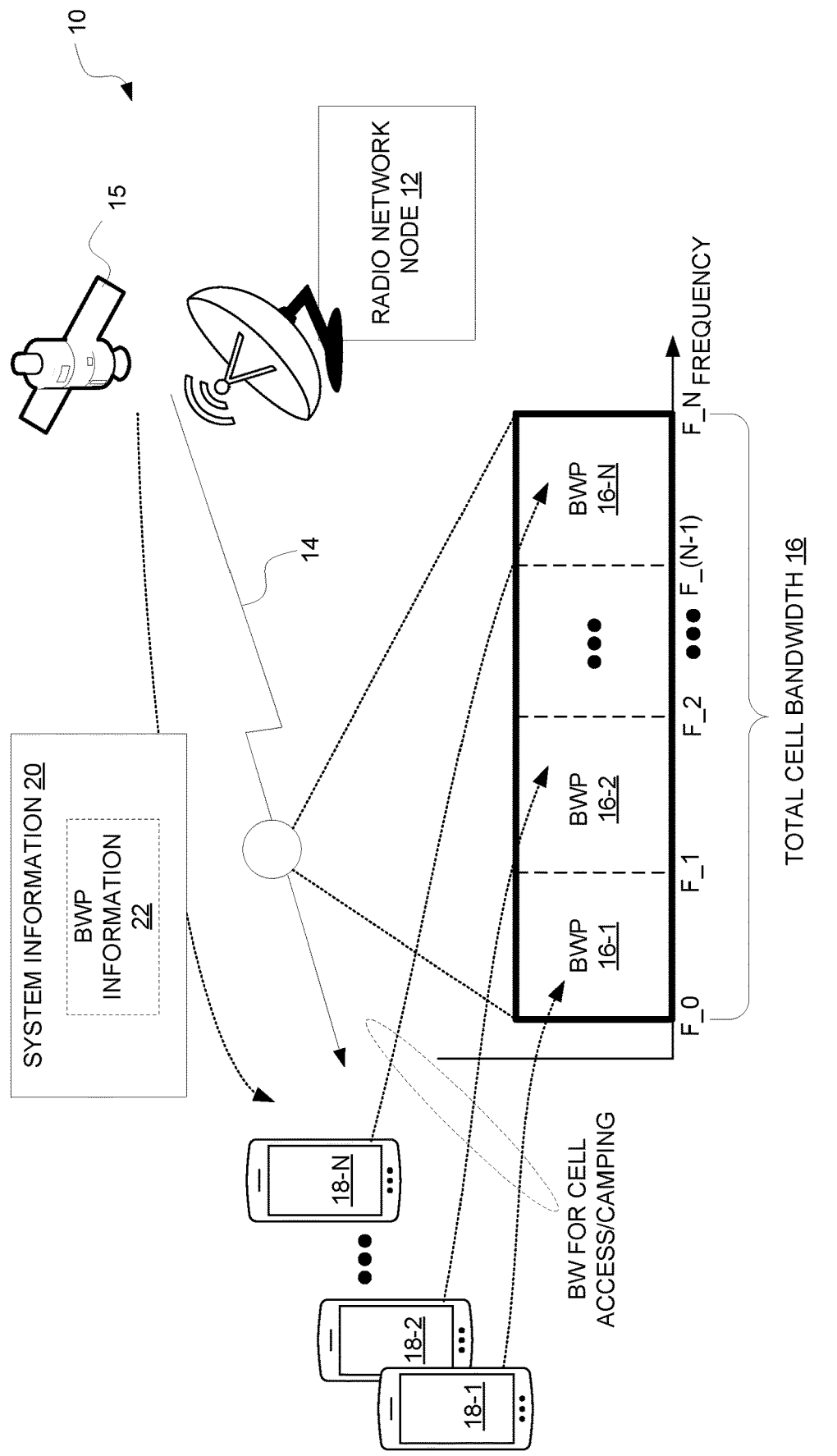
FIG. 2 is a block diagram of a wireless communication network in which different wireless devices use different bandwidth parts of a cell to access or camp on the cell.

These and other embodiments effectively control or configure wireless device BWP selection so that at least some wireless devices select different BWPs for accessing or camping on the cell 14, e.g., from RRC idle or RRC inactive. FIG. 2 in this regard shows a simple example where wireless devices 18-1, 18-2, . . . 18-N each receive the broadcast information 20 informing the devices about the multiple BWPs 16-1, 16-2, . . . 16-N. Having been informed about the multiple BWPs 16-1, 16-2, . . . 16-N, wireless device 18-1 in this example selects BWP 16-1 for cell access or camping, wireless device 18-2 selects BWP 16-2 for cell access or camping, and so on up to wireless device 18-N selects BWP 16-N for cell access or camping. These and other examples demonstrate that some embodiments distribute loading attributable to access and camping across multiple BWPs 16-1, 16-2, . . . 16-N of the cell 14 so as to advantageously alleviate bottlenecking and increase system capacity. Such may prove particularly advantageous in embodiments where the cell 14 is in a non-terrestrial network (NTN) or otherwise has a large coverage area.

In embodiments where the wireless device's BWP selection is deterministic, such as where BWP selection is performed based on an identity associated with the wireless device or a subscriber, the radio network node 12 may similarly select to use the same BWP(s) to serve the wireless device 18, e.g., in RRC idle state or RRC inactive state. For example, the radio network node 12 may determine, based on an identity which identifies the wireless device 18 or a subscriber associated with the wireless device 18, the downlink BWP that the wireless device 18 is to select for camping on the cell 14. The radio network node 12 may then page the wireless device 18 within the determined downlink BWP. Alternatively or additionally, the radio network node 12 may determine, based on an identity which identifies the wireless device 18 or a subscriber associated with the wireless device 18, the uplink BWP that the wireless device 18 is to select for accessing the cell 14. The radio network node 12 may then monitor for a random access preamble from the wireless device 18 within the determined uplink BWP.

In other embodiments where BWP selection is non-deterministic, such as where BWP selection is random or based upon signal measurements, the radio network node 12 may account for the wireless device 18 selecting any of the multiple BWPs 16-1, 16-2, . . . 16-N indicated. For example, where the multiple BWPs 16-1, 16-2, . . . 16-N are uplink BWPs, the radio network node 12 may monitor each of two or more of the uplink BWPs for use by the wireless device 18 to access the cell 14, e.g., for a random access preamble from the wireless device 18. As another example, where the multiple BWPs 16-1, 16-2, . . . 16-N are downlink BWPs, the radio network node 12 may page the wireless device 18 in each of the multiple downlink BWPs.

Note that accessing the cell 14 using one or more of the multiple BWPs 16-1, 16-2, . . . 16-N indicated may involve transmitting or receiving one or more messages of a random access procedure, e.g., in one or more of the BWPs indicated. Accessing the cell 14 in this case involves attempting to perform random access to the cell 14, e.g., so as to potentially contend for access with one or more other wireless devices. This access to the cell 14 may be performed from RRC idle state, so as to be referred to as the wireless device's initial access to the cell 14 from that state. In these and other embodiments, during initial access, the wireless device 18 may perform cell search based on a synchronization signal block (SSB), read the system information 20 (e.g., SIB1) on one of the BWPs 16-1, 16-2, . . . 16-N (e.g., BWP #0), and select a BWP from the multiple BWPs 16-1, 16-2, . . . 16-N configured in the system information 20 to perform RRC idle random access and/or read paging.

Note further that camping on the cell 14 using one or more of the BWPs 16-1, 16-2, . . . 16-N indicated (e.g., in the form of downlink BWPs) may involve monitoring a paging channel in one or more of the multiple BWPs 16-1, 16-2, . . . 16N. More broadly, though, a wireless device 18 camping on the cell 14 herein refers to the wireless device 18 monitoring one or more downlink channels of the cell 14, e.g., from a state in which the wireless device 18 has acquired system information and knows how to send a random access preamble on the random access channel to access the cell 14. In some embodiments, when the wireless device 18 is camped on a cell, the wireless device 18 has completed the cell (re)selection process, has chosen a cell, monitors system information, and (in most cases) monitors paging information. Camping therefore enables the wireless device 18 to receive system information, initially access the network on the control channel of the cell on which it is camped, and receive a paging message and respond.

Of course, although the wireless device 18 was described in some embodiments above as using one or more of the multiple BWPs 16-1, 16-2, . . . 16-N for accessing, or camping on, the cell 14, the wireless device 18 in other embodiments may use one or more of the multiple BWPs 16-1, 16-2, . . . 16-N to perform any type of operation(s) in an RRC idle state or an RRC inactive state. That is, the multiple BWPs 16-1, 16-2, . . . 16-N in some embodiments are each usable by the wireless device 18 to perform one or more operations in an RRC idle state or an RRC inactive state. These operation(s) may include or relate to Public Land Mobile Network (PLMN) selection, cell (re)selection, and/or location registration and RAN Notification Area (RNA) update. These operation(s) may be implemented, for example, as described in 3GPP TS 38.304 v15.6.0.

Note that an RRC idle state herein is a state in which the wireless device 18 has no RRC connection established. In the RRC idle state, the wireless device 18 may acquire system information 20, monitor a paging channel for core network paging, and/or perform neighbor cell measurements and cell (re)selection. An RRC inactive state herein is a state in which the wireless device has an RRC connection established, but the RRC connection is suspended. In the RRC inactive state, the wireless device 18 may store a context for the suspended RRC connection, acquire system information 20, monitoring a paging channel for core network paging and/or radio access network (RAN) paging, perform neighbor cell measurements and cell (re)selection, and/or perform RAN-based notification area updates. By storing the context for the suspended RRC connection, the wireless device 18 can resume the RRC connection more quickly than if the wireless device 18 had released the context as in RRC idle state. If inactivity continues for longer than a certain time, the wireless device 18 may only then release its RRC connection with the access network and transition to RRC idle state. On the other hand, if the wireless device 18 becomes active, the wireless device 18 may transition to an RRC connected state in order to establish or resume an RRC connection.

Note further that the multiple BWPs 16-1, 16-2, . . . 16-N indicated by the system information 20 have been exemplified as multiple downlink BWPs or multiple uplink BWPs. In some embodiments where the multiple BWPs are multiple downlink BWPs, the wireless device 18 may be configured to select one or more of the multiple downlink BWPs (e.g., to use for accessing or camping on the cell 14) independently of which one or more uplink BWPs the wireless device 18 uses. That is downlink BWP selection may be independent of any uplink BWP selection or use. In other embodiments where the multiple BWPs are multiple uplink BWPs, the wireless device 18 may be configured to select one or more of the uplink downlink BWPs (e.g., to use for accessing the cell 14) independently of which one or more downlink BWPs the wireless device 18 uses. That is uplink BWP selection may be independent of any downlink BWP selection or use.

Note, too, that the system information 20 in some embodiments may indicate both multiple downlink BWPs and multiple uplink BWPs, e.g., where the same or different numbers of BWPs may be indicated for the uplink and downlink. In this case, BWP selection may be separately applied for the uplink and downlink. Of course, such selection may be conditioned on the system information 20 actually indicating multiple BWPs from which to select. For example, the system information 20 may configure one downlink BWP #0 and 3 uplink BWPs. In this case, the wireless device 18 does not need to perform downlink BWP selection and may select an uplink BWP from the 3 configured uplink BWPs.

In still other embodiments, the system information 20 may indicate selectable BWP pairs, with each BWP pair including a downlink BWP and an uplink BWP so as to link a downlink BWP with an uplink BWP. In this case, the wireless device 18 may be configured to select one of the BWP pairs, e.g., to use for accessing or camping on the cell 14. In one such embodiment, a BPW mapping table is configured, where each entry of the table indicates a BWP pair linking a downlink (DL) BWP to an uplink (UL) BWP. A downlink BWP may be paired with zero, one, or more uplink BWPs. For example, with one downlink BWP #0 and three uplink BWPs #0, #1, and #2, a mapping table with four entries (DL BWP#0, null), (DL BWP#0, UL BWP#0), (DL BWP#0, UL BWP#1), and (DL BWP#0, UL BWP#2) may be configured. To select an appropriate BWP pair, the wireless device 18 may first perform DL BWP selection. If the determined DL BWP is included in only one entry in the mapping table, the paired UL BWP (if not null) is determined accordingly. If the determined DL BWP is included in more than one entry in the mapping table, the wireless device 18 may proceed to perform UL BWP selection or choose to operate without UL BWP. In the aforementioned example, the wireless device 18 first determines DL BWP#0, which is the only DL BWP, and continues with UL BWP selection or chooses to operate without UL BWP. This two-step procedure determines the selected BWP pair. Furthermore, with BWP paring, BWP switching may be applied per BWP pair.

In still other embodiments herein, the system information 20 or other signaling may indicate a polarization mode for a BWP. The system information 20 or other signaling may for example indicate a first polarization mode for a first BWP of the multiple BWPs 16-1, 16-2, . . . 16-N of the cell 14, and indicate a second polarization mode for a second BWP of the multiple BWPs 16-1, 16-2, . . . 16-N of the cell 14. Correspondingly, then, communication in the first BWP is to be performed with the first polarization and communication in the second BWP is to be performed with the second polarization. This second polarization may be orthogonal to the first polarization. If the first polarization is right-hand circular polarization (RHCP), for example, the second polarization may be left-hand circular polarization (LHCP), and vice versa. The network 10 in these and other embodiments may thereby use two orthogonal polarizations to configure two layers making use of the same spectrum resource, and each comprising one or more BWPs.

Figure 3:
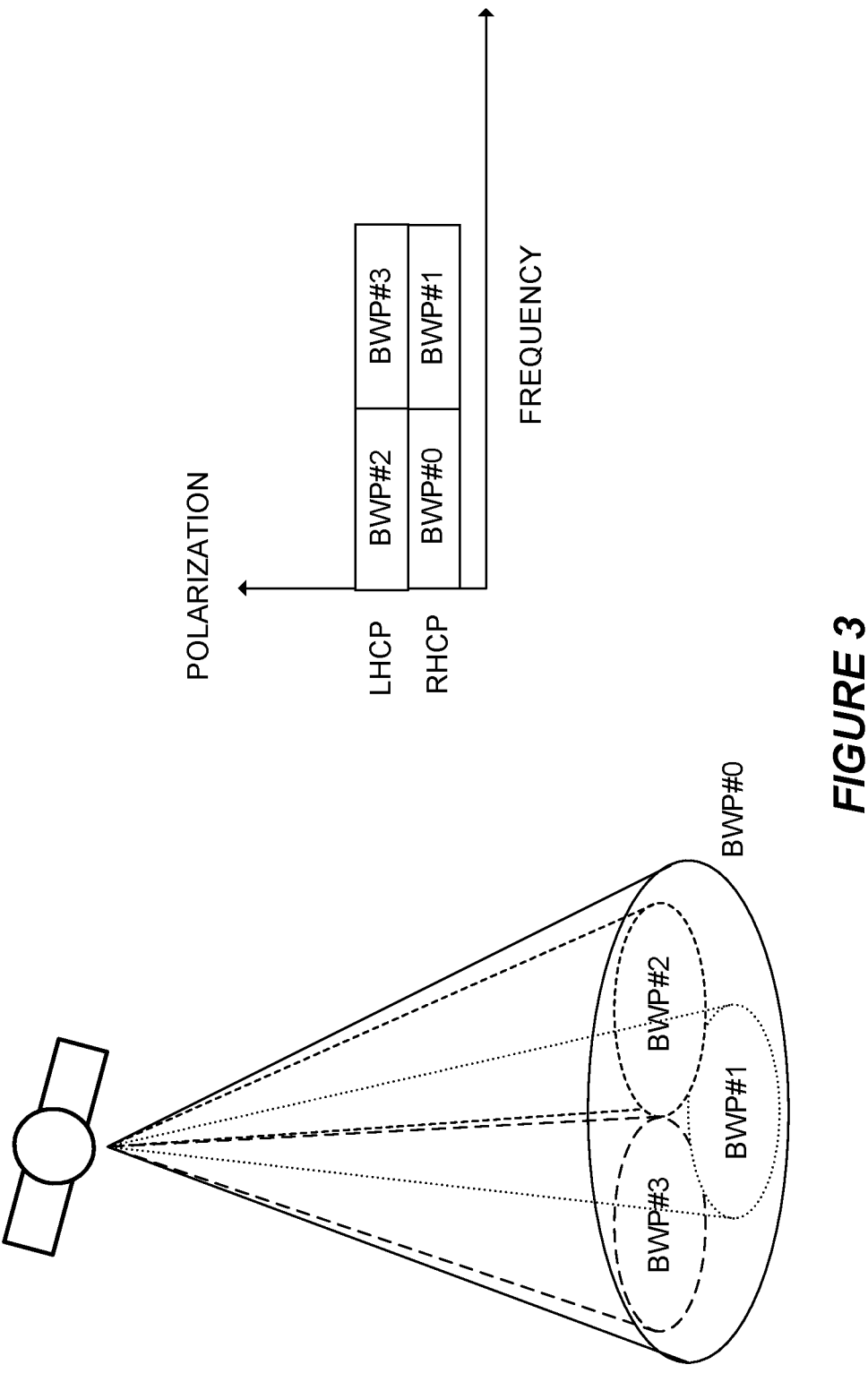
FIG. 3 is a block diagram of a bandwidth part based polarization scheme according to some embodiments.

FIG. 3 shows one example of how these embodiments may support BWP-based frequency and polarization reuse, e.g., in an NTN. As shown, BWP#0 covers the entire cell 14 and additional BWPs #1, #2, and #3 may be dynamically configured to cover different parts of the cell 14. To have cell-wide coverage for BWP#0, a wide beam for BWP#0 can continuously cover the full cell (as shown), or a narrow beam can cover different parts of the cell 14 with a time-multiplexed pattern. BWPs #1, #2, and #3 may be mapped to different beams to create frequency-reuse. Notably, each BWP, and the transmissions made in each BWP, are associated with a frequency range and a polarization mode. BWP#0 and BWP#2 are associated with the same frequency range, but different polarization modes. BWP#1 and BWP#3 are similarly associated with the same frequency range, but different polarization modes.

Alternatively or additionally to the above embodiments in FIGS. 1-3, FIG. 4 shows that some embodiments may exploit multiple synchronization signal blocks (SSBs) for the cell 14. As shown, for example, multiple SSBs 34-1, 34-2, . . . 34-M are transmitted for the cell 14, e.g., at different frequency positions within the same carrier and/or within total cell bandwidth 16. Each SSB 34-1, 34-2, . . . 34-M includes one or more synchronization signals, e.g., a primary synchronization signal (PSS) and a secondary synchronization signal (SSS). The one or more synchronization signals of each SSB may collectively convey a Physical Cell Identity (PCI), which may or may not be unique across the PCIs conveyed by different SSBs. In some embodiments, each SSB 34-1, 34-2, . . . 34-M also includes a Physical Broadcast Channel (PBCH). In this case, each SSB may also be referred to as a synchronization signal (SS)/PBCH block, yet still be denoted as an SSB for convenience. FIG. 5 shows the time-frequency structure of each SSB according to some of these embodiments.

In some embodiments, two or more of the SSBs 34-1, 34-2, . . . 34-M are so-called cell-defining (CD) SSBs for the same cell 14. A CD-SSB as used herein is an SSB associated with a system information block (e.g., SIB1) that defines the scheduling of other system information blocks. Such a system information block (e.g., SIB1) may also be referred to as Remaining Minimum SI (RMSI), in which case a CD-SSB is an SSB associated with RMSI. In some embodiments, a CD-SSB indicates a control resource set for such a system information block (e.g., SIB1).

Figure 4:
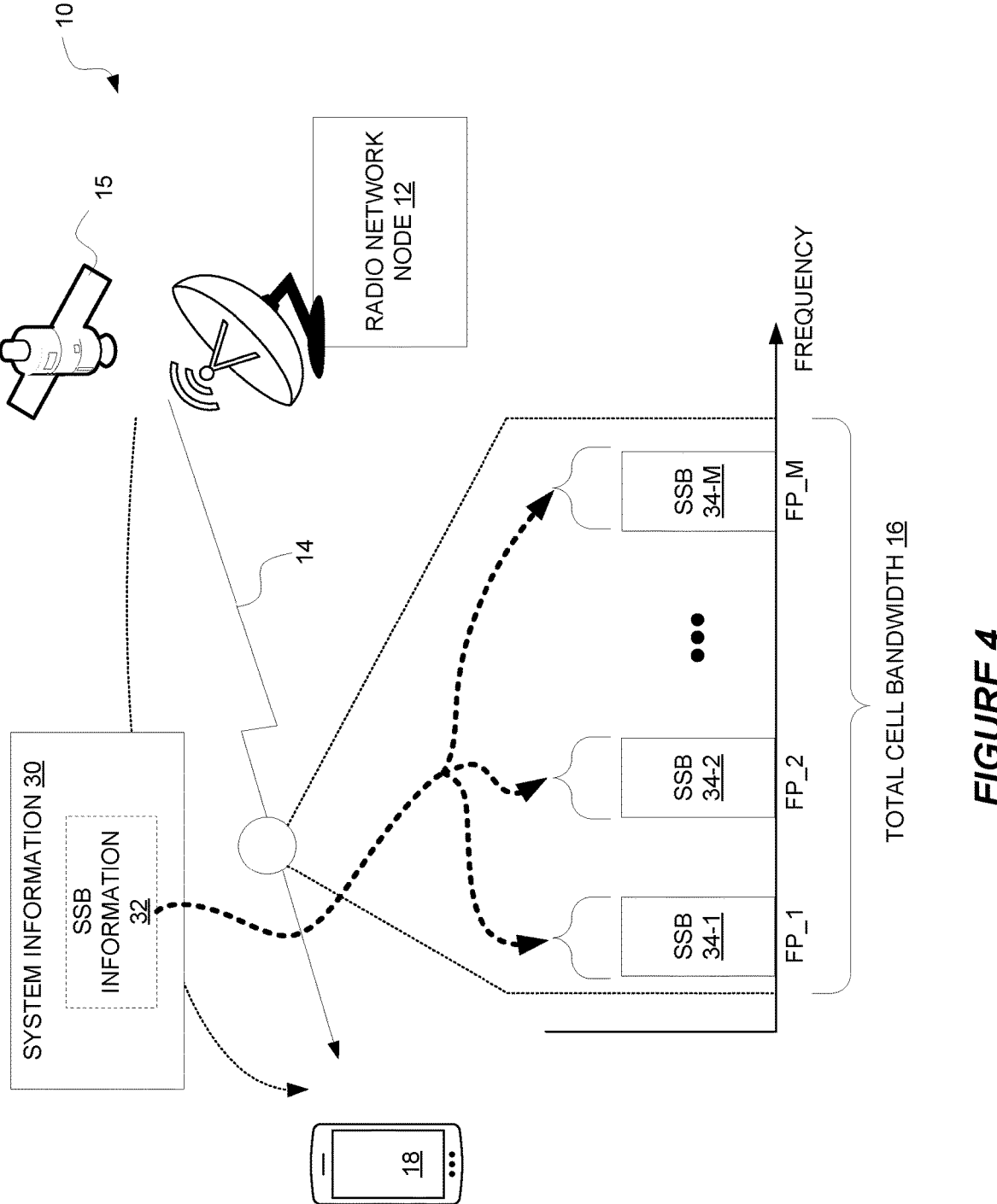
FIG. 4 is a block diagram of a wireless communication network in which frequency positions of respective synchronization signal blocks for a cell are indicated to a wireless device according to some embodiments.
Figure 5:
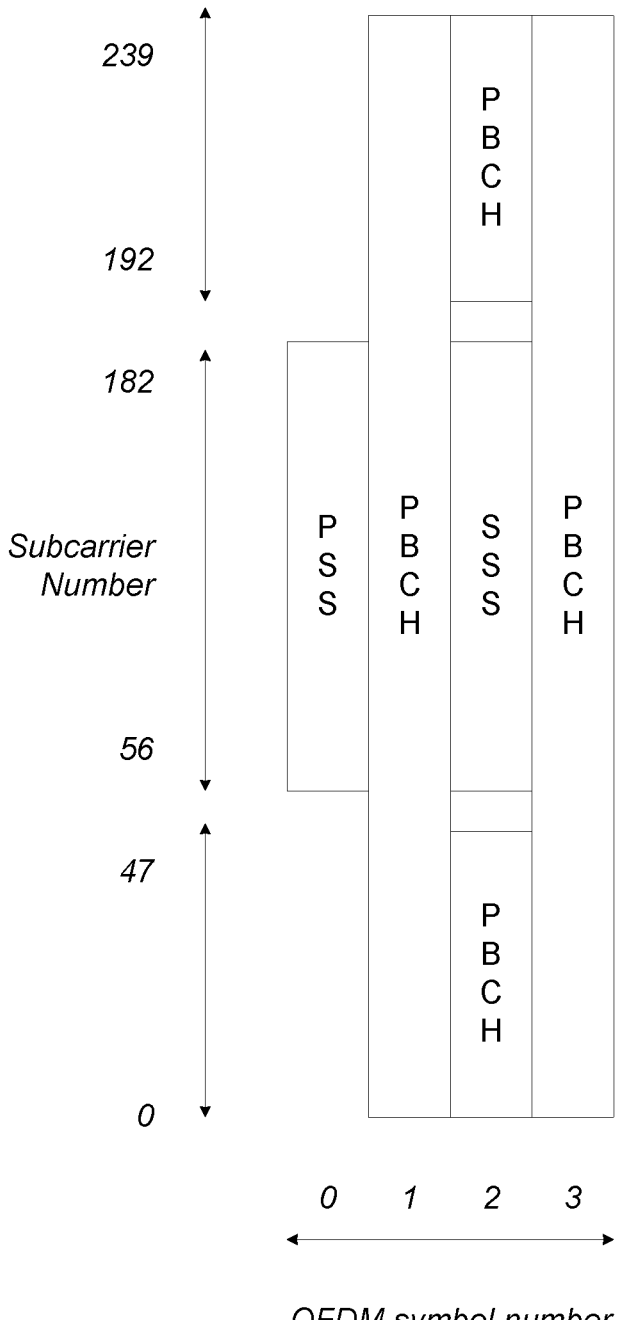
FIG. 5 is a block diagram of a synchronization signal block according to some embodiments.

Regardless, according to some embodiments in FIG. 4, the radio network node 12 informs the wireless device 18 of respective frequency positions of the multiple SSBs 34-1, 34-2, . . . 34-M for the cell 14. As shown, for example, the radio network node 12 broadcasts system information 30 for the cell 14, e.g., in the form of a System Information Block Type 1 (SIB1). The system information 30 may be the same as or different from the system information 20 described in FIGS. 1-3. Regardless, this system information 30 indicates (e.g., via SSB information 32) respective frequency positions FP_1, FP_2, . . . FP_M of the multiple SSBs 34-1, 34-2, . . . 34-M for the cell 14. The frequency position of each SSB may be indicated by an absolute radio-frequency channel number (ARFCN). Alternatively, since the system information 30 may include frequency information about the carrier, the frequency position of each SSB may be indicated relative to the carrier frequency position. In one example, the system information 30 indicates which subcarrier or resource block in the carrier is the starting subcarrier or resource block of each SSB. In another example, a bitmap, where each bit indicates a subcarrier or a resource block of the carrier, is used to indicate the SSB frequency positions. A value of "1" in the bitmap indicates the corresponding subcarrier or resource block is the starting point of an SSB.

Signaling the respective frequency positions of the multiple SSBs 34-1, 34-2, . . . 34-M for the cell 14 in these or other ways may advantageously enable adaptive use of BWPs for frequency reuse planning, e.g., based on traffic demand. Indeed, in these and other embodiments, SSBs may be flexibly positioned as needed so that any given BWP may have zero, one, or more SSBs included therein, or even have a fraction of an SSB included therein. Rate matching may then be employed for data channel transmissions, to account for potentially multiple SSBs being positioned within the operating bandwidth of the wireless device 18, e.g., in the form of a selected BWP from among multiple BWPs 16-1, 16-2, . . . 16-N. In particular, the radio network node 12 may map a data channel of the cell 14 onto radio resources in dependence on one or more respective frequency positions of one or more of the multiple SSBs 34-1, 34-2, . . . 34-M for the cell 14. The radio network node 12 may then transmit the data channel on the radio resources according to that mapping. Correspondingly, the wireless device 18 may determine, based on one or more respective frequency positions of one or more of the multiple SSBs 34-1, 34-2, . . . 34-M for the cell indicated by the received system information 30, radio resources on which to receive the data channel. The wireless device 18 may accordingly receive the data channel on radio resources according to that determination.

In embodiments where the data channel is a Physical Downlink Shared Channel (PDSCH), for instance, the wireless device 18 may make assumptions based on whether the PDSCH carries SIB1. When receiving a PDSCH carrying SIB1, the wireless device 18 may assume that no SSB is transmitted in radio resources (e.g., resource elements, REs) used by the wireless device 18 for reception of the PDSCH. By contrast, when receiving a PDSCH carrying information other than SIB1, and if the PDSCH resource allocation overlaps with physical resource blocks containing SSB transmission resources, the wireless device 18 shall assume that the physical resource block containing SSB transmission resources are not available for PDSCH in the (e.g., Orthogonal Frequency Division Multiplexing, OFDM) symbols where SSB is transmitted. In one example, the PDSCH is assumed to be punctured at the "not available" resources. In other examples, the PDSCH resource mapping is performed such that it is not mapped to the "not available" resources, i.e., PDCH rate matching is applied for the "not available" resources.

Note that the system information 30 in some embodiments may indicate the respective SSB frequency positions FP_1, FP_2, . . . FP_M on a carrier level, not on a BWP level. That is, the system information may not distinguish between different BWPs of the cell 14 in indicating the SSB frequency positions. Nonetheless, equipped with these SSB frequency positions for the cell 14, the wireless device 18 may determine which SSBs fall within the BWP in which the wireless device 18 receives a data channel for the cell 14 so as to rate match around the corresponding radio resources. Some embodiments may thereby advantageously enable adaptive use of BWPs for frequency reuse planning, e.g., based on traffic demand, while preserving data channel performance.

Note further that the system information 30 may indicate the SSB frequency positions FP_1, FP_2, . . . FP_M in conjunction with indicating the positions of the SSBs in time as well. That is, SSB positions in both time and frequency for the cell 14 may be signalled to the wireless device 18, which may in turn take into account multiple SSBs in frequency for data channel mapping.

In one embodiment in this regard, the system information 30 includes a parameter that indicates the respective frequency positions in addition to a single ssb-PositionsInBurst parameter. This single ssb-PositionsInBurst parameter indicates timing of the SSBs 34-1, 34-2, . . . 34-M per half frame, e.g., in terms of SSB periodicity and SSB symbol positions. In these embodiments, then, the same SSB pattern in time is repeated in two or more of the multiple frequency positions indicated.

In other embodiments, the system information 30 includes a parameter that indicates SSB positions in frequency. And, for each SSB position in frequency, the system information 30 includes a separate bitmap that indicates SSB positions in time per half frame and SSB periodicity. In this case, different SSB patterns in time may be signalled in two or more frequency positions.

Note further that the frequency position of at least one of the multiple SSBs may have already been identified by the wireless device 18, e.g., as part of cell search in order to receive the system information 30. The system information 30 in at least some embodiments, then, may not indicate the frequency position of such an SSB, e.g., the frequency position of the SSB associated with the system information 30. The system information 30 therefore generally indicates the frequency position of at least one of the multiple SSBs 34-1, 34-2, . . . 34-M.

Figure 6:
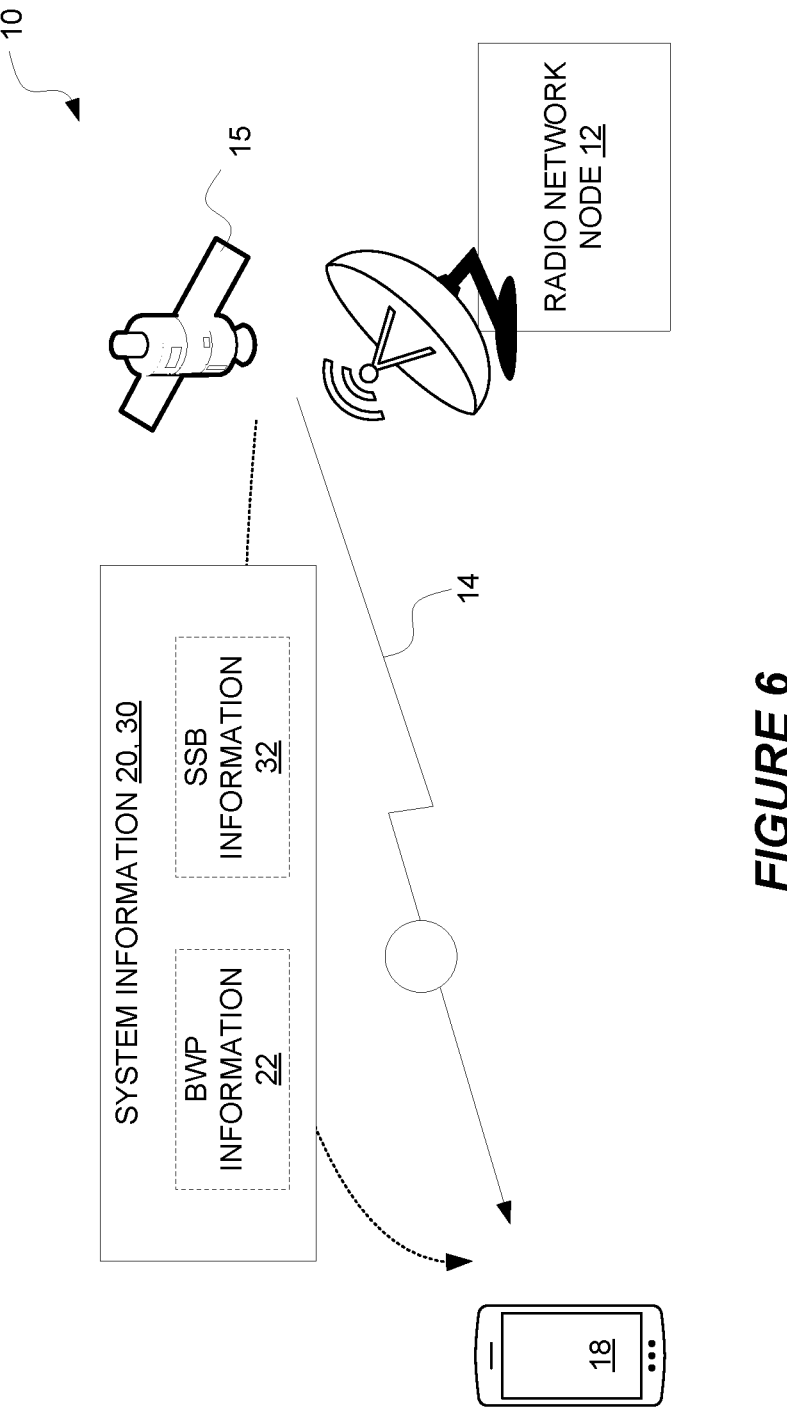
FIG. 6 is a block diagram of a wireless communication network in which system information indicates multiple bandwidth parts of a cell and indicates frequency positions of respective synchronization signal blocks of the cell.

Note that embodiments in FIGS. 1-3 and embodiments in FIGS. 4-5 may be employed separately or in combination. FIG. 6 for example shows that the radio network node 12 may transmit system information 20, 30 to the wireless device 18, e.g., including both BWP information 22 and SSB information 32, for use as described above.

Figure 7:
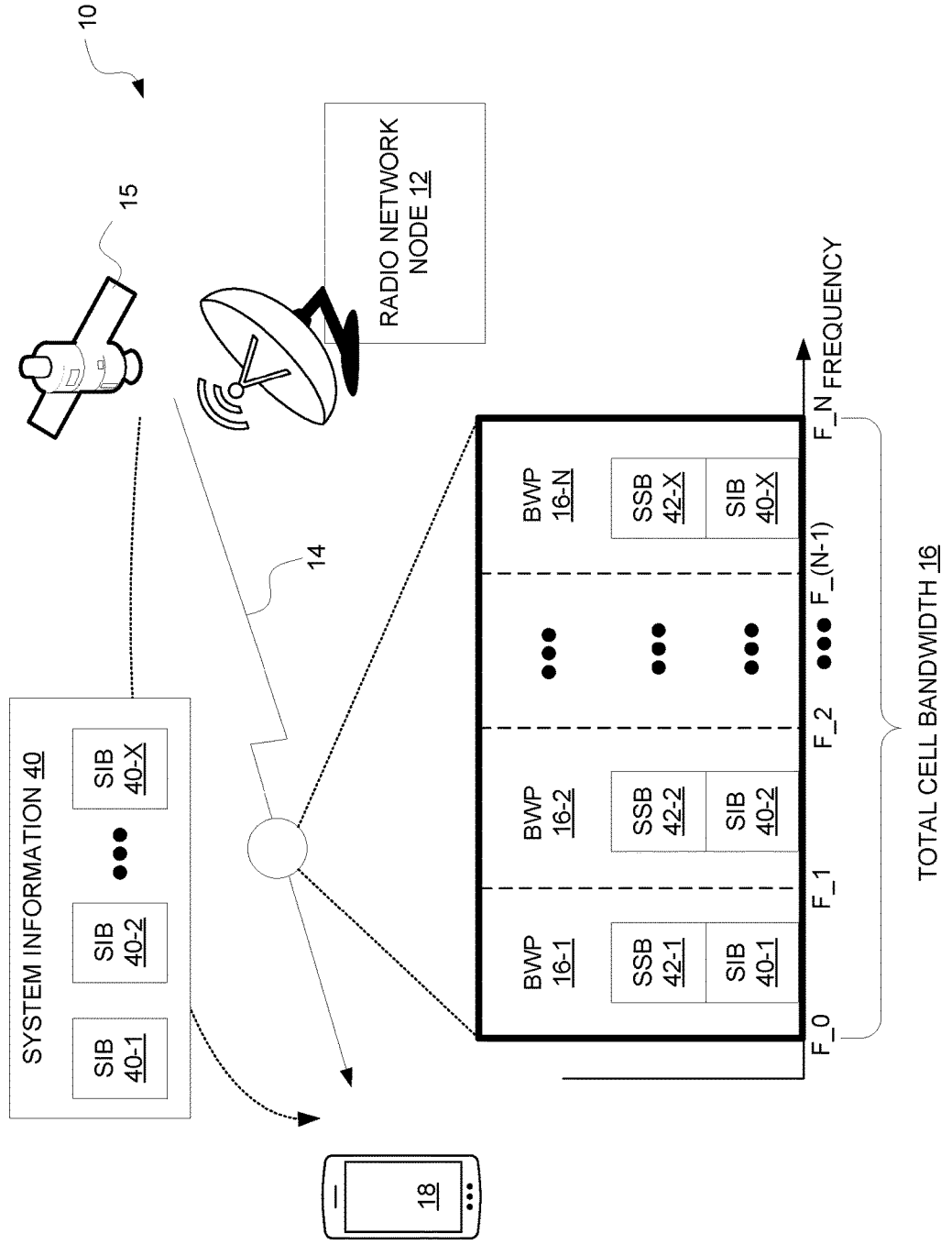
FIG. 7 is a block diagram of a wireless communication network in which multiple system information blocks (e.g., SIB1s) are broadcast for a cell according to some embodiments.

FIG. 7 illustrates still other embodiments herein. As shown, the radio network node 12 alternatively or additionally broadcasts multiple system information blocks (SIBs) 40-1, 40-2, . . . 40-X. Each of these SIBs 40-1, 40-2, . . . 40-X indicates system information 40 for the same cell 14. In fact, in some embodiments, the SIBs 40-1, 40-2, . . . 40-X redundantly provide the same system information. Moreover, each of these SIBs 40-1, 40-2, . . . 40-X defines scheduling of other system information blocks (not shown). Accordingly, each such SIB may also be referred to as a System Information Block Type 1 (SIB1) or as Remaining Minimum SI (RMSI). That is, rather than only one such SIB being broadcast for the cell 14, multiple such SIBs are broadcast for the same cell 14. Accordingly, multiple such SIBs 40-1, 40-2, . . . 40-X may be associated with the same unique cell identity, e.g., NR Cell Global Identity (NCGI).

In some embodiments, the multiple SIBs may be broadcast at different frequency positions within the same carrier. For example, at least two or more of the multiple SIBs 40-1, 40-2, . . . 40-X may be broadcast in different downlink BWPs of the cell 14. As shown in FIG. 7, for instance, SIB 40-1 is broadcast in BWP 16-1, SIB 40-2 is broadcast in BWP 16-2, SIB 40-X is broadcast in BWP 16-N, etc. where N may or may not be equal to X.

Also as shown, the radio network node 12 may further transmit SSBs 42-1, 42-2, . . . 42-X. These SSBs 42-1, 42-2, . . . 42-X may be associated with respective ones of the multiple SIBs 40-1, 40-2, . . . 40-X broadcasted. For example, the SSBs 42-1, 42-2, . . . 42-X may indicate parameters (e.g., control resource sets) for receiving respective ones of the multiple SIBs 40-1, 40-2, . . . 40-X broadcasted. In these and other embodiments, then, the SSBs 42-1, 42-2, . . . 42-X may each be a CD-SSB as described above.

With SSBs 42-1, 42-2, . . . 42-X broadcast in this way, the wireless device 18 will search along a raster for an SSB. When the wireless device 18 finds and synchronizes to a suitable SSB, the wireless device 18 will read system information (e.g., in the form of a Master Information Block, MIB) included in that found SSB. This system information will provide the wireless device 18 with information needed to receive whichever of the SIBs 40-1, 40-2, . . . 40-X is broadcast in the same BWP as the BWP within which the wireless device 18 found the suitable SSB. In some embodiments, the wireless device 18 is configured to access, or camp on, the cell 14 using this BWP, e.g., from RRC idle state or RRC inactive state. In this case, then, the BWP serves as the initial BWP that the wireless device 18 uses to initially access the cell 14 from RRC idle. Correspondingly, with multiple SSBs 42-1, 42-2, . . . 42-X and SIBs 40-1, 40-2, . . . 40-X broadcast in respective BWPs 16-1, 16-2, . . . 16-N for the cell 14, the multiple BWPs 16-1, 16-2, . . . 16-N may be referred to as multiple initial BWPs for the same cell 14.

Figure 8:
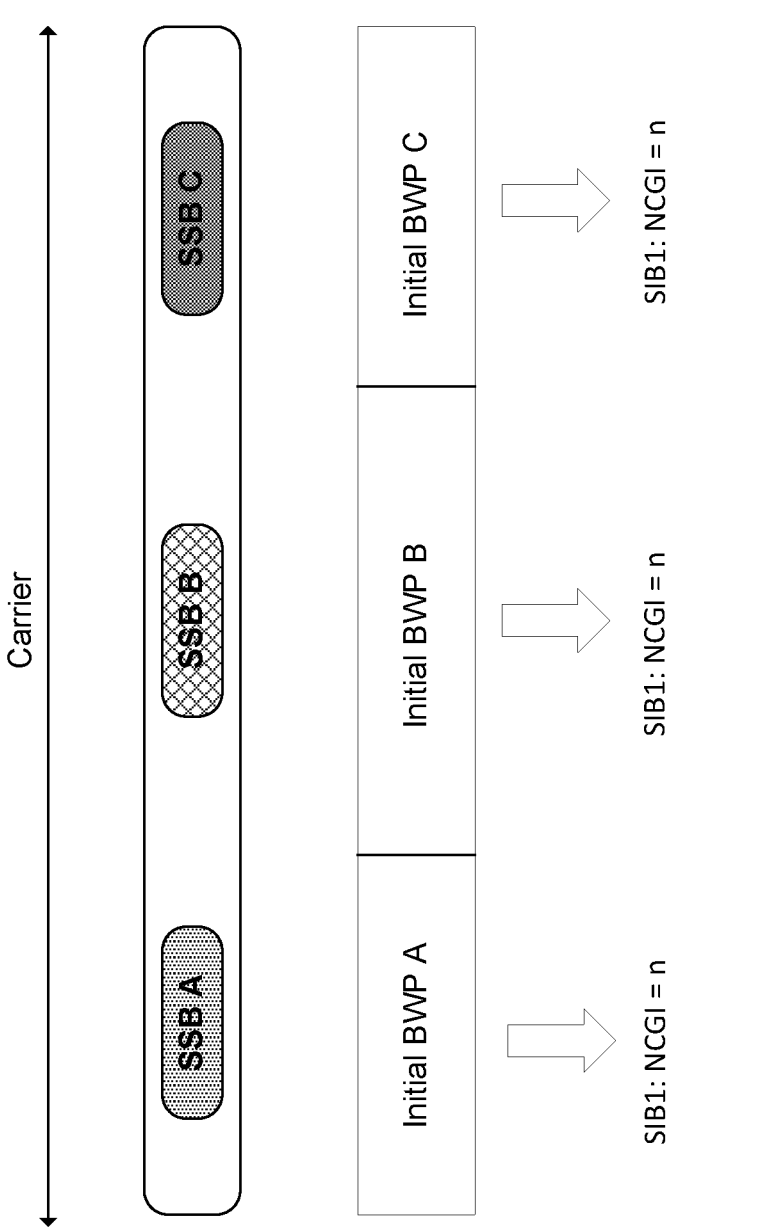
FIG. 8 is a block diagram of transmission of synchronization signal blocks and system information blocks according to some embodiments.

FIG. 8 for example shows one example where multiple SIB1 blocks associated with the same NCGI=n are transmitted within respective initial BWPs A, B, and C. And respective SSBs A, B, and C are transmitted within respective initial BWPs A, B, and C as well. Accordingly, the same carrier provides multiple SSBs, with more than one initial BWP being associated to the same NCGI, e.g., such that the same system information is provided in the associated SIB1 in the initial BWP corresponding to each SSB. In some embodiments, each BWP broadcasts SIB1. This SIB1 may be broadcast on the PDSCH, which is scheduled by downlink control information (DCI) on the Physical Downlink Control Channel (PDCCH) using a control resource set associated with the SSB in the corresponding BWP. The SIB1 in each BWP may further configure a control resource set. Each BWP may configure its radio resources for paging and random access.

To the extent that different wireless devices find and synchronize to different SSBs in different BWPs with respective SIBs, these embodiments may similarly prove effective in distributing load attributable to access and camping across multiple BWPs of the cell 14. Again, this alleviates bottlenecking and increases system capacity, which may prove particularly advantageous in embodiments where the cell 14 is in a non-terrestrial network (NTN) or otherwise has a large coverage area.

Note that, in the case where more than one initial BWP is associated to the same NCGI, the SSB for each initial BWP may provide the same or different physical cell identities (PCIs). These SSBs may share the synchronization raster location which the wireless device 18 uses for scanning SSBs for initial access, or they may be on different absolute radio frequency channel number (ARFCN) on the synchronization raster. This essentially means potentially mapping one NCGI to more than one PCI. For Xn signaling and PCI mapping tables, one of the PCIs can be determined to be the main PCI, or mapped PCI even from the device perspective. Each PCI/SSB may provide SIB1 and thus an initial access opportunity to this NCGI. System information may point if the PCI is the main or mapped PCI for possible self-organizing network (SON) reporting.

Note that some embodiments herein may be realized in the context of 3GPP standardized operation of a Non-Terrestrial Network (NTN). A satellite radio access network usually includes the following components: (i) a satellite that refers to a space-borne platform; (ii) an earth-based gateway that connects the satellite to a base station or a core network, depending on the choice of architecture; (iii) a feeder link that refers to the link between a gateway and a satellite; and (iv) a service link that refers to the link between a satellite and a UE.

Two popular architectures are the Bent pipe transponder and the Regenerative transponder architectures. In the first case, the base station is located on earth behind the gateway, and the satellite operates as a repeater forwarding the feeder link signal to the service link, and vice versa. In the second case, the satellite is in the base station and the service link connects it to the earth-based core network.

Depending on the orbit altitude, a satellite may be categorized as low earth orbit (LEO), medium earth orbit (MEO), or geostationary earth orbit (GEO) satellite. LEO has typical heights ranging from 250-1,500 km, with orbital periods ranging from 90-120 minutes. MEO has typical heights ranging from 5,000-25,000 km, with orbital periods ranging from 3-15 hours. And GEO has a height at about 35,786 km, with an orbital period of 24 hours.

A communication satellite typically generates several beams over a given area. The footprint of a beam is usually in an elliptic shape, which has been traditionally considered as a cell. The footprint of a beam is also often referred to as a spotbeam. The spotbeam may move over the earth surface with the satellite movement or may be earth fixed with some beam pointing mechanism used by the satellite to compensate for its motion. The size of a spotbeam depends on the system design, which may range from tens of kilometers to a few thousands of kilometers.

Figure 9:
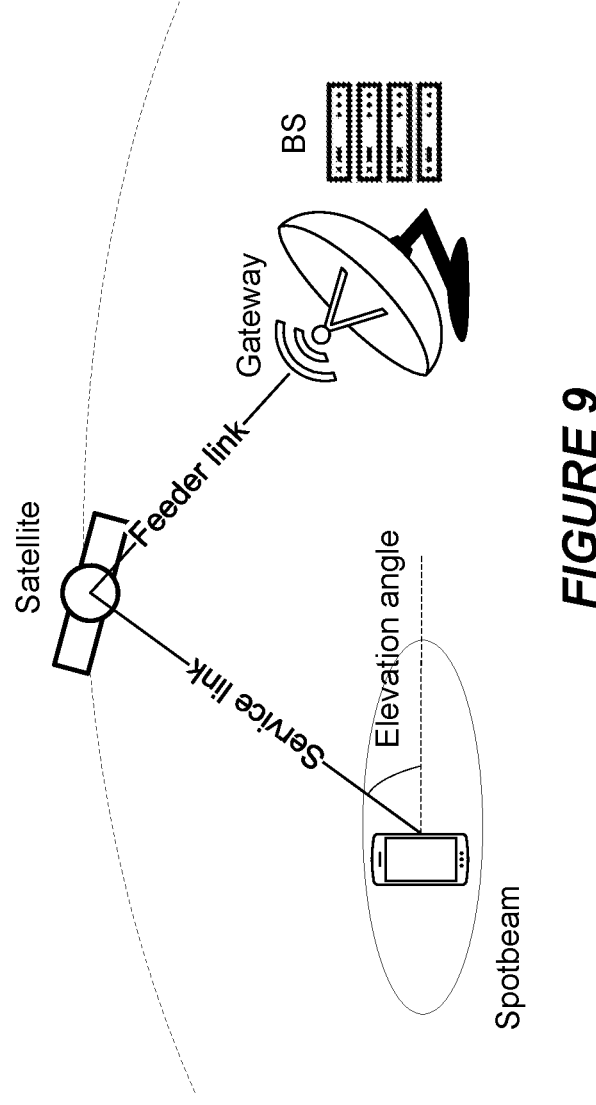
FIG. 9 is a block diagram of a non-terrestrial network according to some embodiments.

FIG. 9 shows an example architecture of a satellite network with bent pipe transponders. The depicted elevation angle of the service link is important as it affects the distance between the satellite and the device, and the velocity of the satellite relative to the device.

In view of the above modifications and variations, FIG. 10 depicts a method performed by a wireless device 18 configured for use in a wireless communication network, e.g., an non-terrestrial network (NTN). The method includes receiving broadcasted system information 20 and/or 30 for a cell 14, e.g., identified with a unique cell global identity (Block 1000). The broadcasted system information 20 and/or 30 may indicate at least one of any one or more of: (i) multiple bandwidth parts (BWPs) 16-1, 16-2, . . . 16-N of the cell 14; and (ii) respective frequency positions FP_1, FP_2, . . . FP_M of multiple synchronization signal blocks (SSBs) 34-1, 34-2, . . . 34-M for the cell 14. In embodiments where the broadcasted system information 20 indicates multiple bandwidth parts 16-1, 16-2, . . . 16-N of the cell 14, the multiple bandwidth parts 16-1, 16-2, . . . 16-N indicated may be either multiple downlink bandwidth parts or multiple uplink bandwidth parts.

In some embodiments, the multiple bandwidth parts 16-1, 16-2, . . . 16-N indicated are each usable by the wireless device 18 to access, or camp on, the cell 18, e.g., in a Radio Resource Control, RRC, idle state or an RRC inactive state. In this case, the method may further comprise selecting, from the multiple bandwidth parts 16-1, 16-2, . . . 16-N indicated, one or more bandwidth parts to use for accessing, or camping on, the cell 14 (Block 1010). Alternatively or additionally, the method may further comprise accessing, or camping on, the cell 14 using one or more of the multiple bandwidth parts 16-1, 16-2, . . . 16-N indicated, e.g., from an RRC idle state or an RRC inactive state (Block 1020).

Alternatively or additionally, in embodiments where the broadcasted system information 30 indicates respective frequency positions FP_1, FP_2, . . . FP_M of multiple synchronization signal blocks (SSBs) 34-1, 34-2, . . . 34-M for the cell 14, the method may further comprise receiving a data channel of the cell 14 on radio resources determined based on those respective frequency positions indicated (Block 1030). The method may for example comprise determining, based on the one or more respective positions of one or more of the multiple 34-1, 34-2, . . . 34-M for the cell 14, radio resources on which to receive a data channel of the cell 14 and receiving the data channel on radio resources according to that determining.

FIG. 11 depicts a method performed by a radio network node 12 configured for use in a wireless communication network 10, e.g., an NTN. The method includes broadcasting system information 20 and/or 30 for a cell 14 (Block 1100). The broadcasted system information 20 and/or 30 may indicate at least one of any one or more of: (i) multiple bandwidth parts (BWPs) 16-1, 16-2, . . . 16-N of the cell 14; and (ii) respective frequency positions FP_1, FP_2, . . . FP_M of multiple synchronization signal blocks (SSBs) 34-1, 34-2, . . . 34-M for the cell 14. In embodiments where the broadcasted system information 20 indicates multiple bandwidth parts 16-1, 16-2, . . . 16-N of the cell 14, the multiple bandwidth parts 16-1, 16-2, . . . 16-N indicated may be either multiple downlink bandwidth parts or multiple uplink bandwidth parts.

In some embodiments where the broadcasted system information 20 and/or 30 indicates multiple BWPs of the cell 14, the method may further comprise determining, from the multiple bandwidth parts 16-1, 16-2, . . . 16-N indicated, a bandwidth part that a wireless device 18 is to use for accessing, or camping on, the cell 14 (Block 1110). The method may then include performing one or more operations associated with the wireless device 18 using the determined bandwidth part for accessing, or camping on, the cell 14. For example, the method may include monitoring for a random access preamble from the wireless device 18 in the determined bandwidth part or paging the wireless device 18 within the determined bandwidth part (Block 1120).

Alternatively or additionally, in some embodiments where the broadcasted system information 20 and/or 30 indicates respective frequency positions FP_1, FP_2, . . . FP_M of multiple synchronization signal blocks (SSBs) 34-1, 34-2, . . . 34-M for the cell 14, the method may further comprise mapping a data channel of the cell 14 onto radio resources in dependence on one or more respective frequency positions of one or more of the multiple SSBs 34-1, 34-2, . . . 34-M for the cell 14, and transmitting the data channel on radio resources according to said mapping (Block 1130).

FIG. 12 depicts another method performed by a radio network node 12 configured for use in a wireless communication network 10, e.g., an NTN. The method includes broadcasting multiple system information blocks (e.g., SIB1s) that each indicate system information for the same cell 14 and that each define scheduling of other system information blocks (Block 1200). The method may alternatively or additionally include transmitting synchronization signal blocks (e.g., CD-SSBs) associated with respective ones of the multiple system information blocks broadcasted (Block 1210).

Embodiments herein also include corresponding apparatuses. Embodiments herein for instance include a wireless device 18 configured to perform any of the steps of any of the embodiments described above for the wireless device 18.

Embodiments also include a wireless device 18 comprising processing circuitry and power supply circuitry. The processing circuitry is configured to perform any of the steps of any of the embodiments described above for the wireless device 18. The power supply circuitry is configured to supply power to the wireless device 18.

Embodiments further include a wireless device 18 comprising processing circuitry. The processing circuitry is configured to perform any of the steps of any of the embodiments described above for the wireless device 18. In some embodiments, the wireless device 18 further comprises communication circuitry.

Embodiments further include a wireless device 18 comprising processing circuitry and memory. The memory contains instructions executable by the processing circuitry whereby the wireless device 18 is configured to perform any of the steps of any of the embodiments described above for the wireless device 18.

Embodiments moreover include a wireless device 18 in the form of a user equipment (UE). The UE comprises an antenna configured to send and receive wireless signals. The UE also comprises radio front-end circuitry connected to the antenna and to processing circuitry, and configured to condition signals communicated between the antenna and the processing circuitry. The processing circuitry is configured to perform any of the steps of any of the embodiments described above for the wireless device 18. In some embodiments, the UE also comprises an input interface connected to the processing circuitry and configured to allow input of information into the UE to be processed by the processing circuitry. The UE may comprise an output interface connected to the processing circuitry and configured to output information from the UE that has been processed by the processing circuitry. The UE may also comprise a battery connected to the processing circuitry and configured to supply power to the UE.

Embodiments herein also include a radio network node 12 configured to perform any of the steps of any of the embodiments described above for the radio network node 12.

Embodiments also include a radio network node 12 comprising processing circuitry and power supply circuitry. The processing circuitry is configured to perform any of the steps of any of the embodiments described above for the radio network node 12. The power supply circuitry is configured to supply power to the radio network node 12.

Embodiments further include a radio network node 12 comprising processing circuitry. The processing circuitry is configured to perform any of the steps of any of the embodiments described above for the radio network node 12. In some embodiments, the radio network node 12 further comprises communication circuitry.

Embodiments further include a radio network node 12 comprising processing circuitry and memory. The memory contains instructions executable by the processing circuitry whereby the radio network node 12 is configured to perform any of the steps of any of the embodiments described above for the radio network node 12.

More particularly, the apparatuses described above may perform the methods herein and any other processing by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 13:
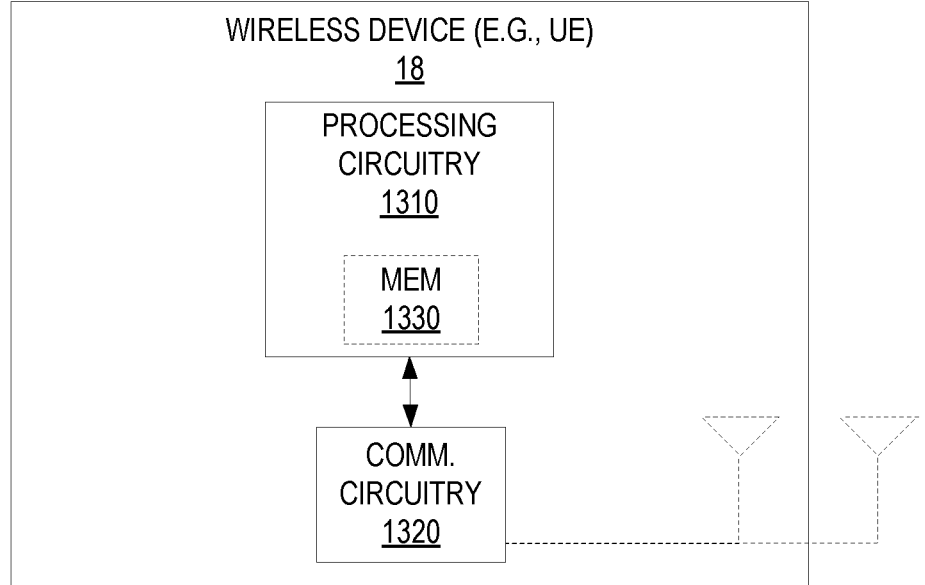
FIG. 13 is a block diagram of a wireless device according to some embodiments.

FIG. 13 for example illustrates a wireless device 18 as implemented in accordance with one or more embodiments. As shown, the wireless device 18 includes processing circuitry 1310 and communication circuitry 1320. The communication circuitry 1320 (e.g., radio circuitry) is configured to transmit and/or receive information to and/or from one or more other nodes, e.g., via any communication technology. Such communication may occur via one or more antennas that are either internal or external to the wireless device 18. The processing circuitry 1310 is configured to perform processing described above, such as by executing instructions stored in memory 1330. The processing circuitry 1310 in this regard may implement certain functional means, units, or modules.

Figure 14:
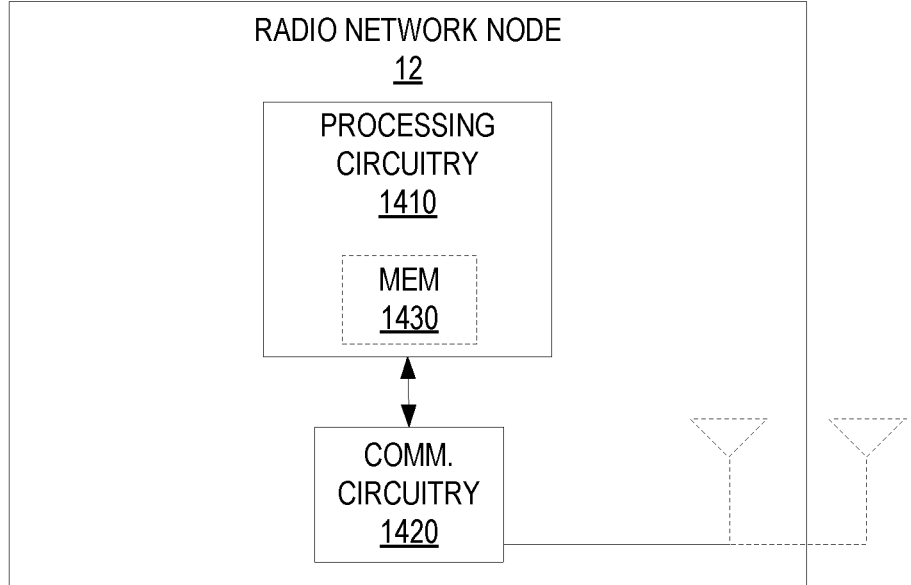
FIG. 14 is a block diagram of a radio network node according to some embodiments.

FIG. 14 illustrates a radio network node 12 as implemented in accordance with one or more embodiments. As shown, the radio network node 12 includes processing circuitry 1410 and communication circuitry 1420. The communication circuitry 1420 is configured to transmit and/or receive information to and/or from one or more other nodes, e.g., via any communication technology. The processing circuitry 1410 is configured to perform processing described above, such as by executing instructions stored in memory 1430. The processing circuitry 1410 in this regard may implement certain functional means, units, or modules.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Figure 15:
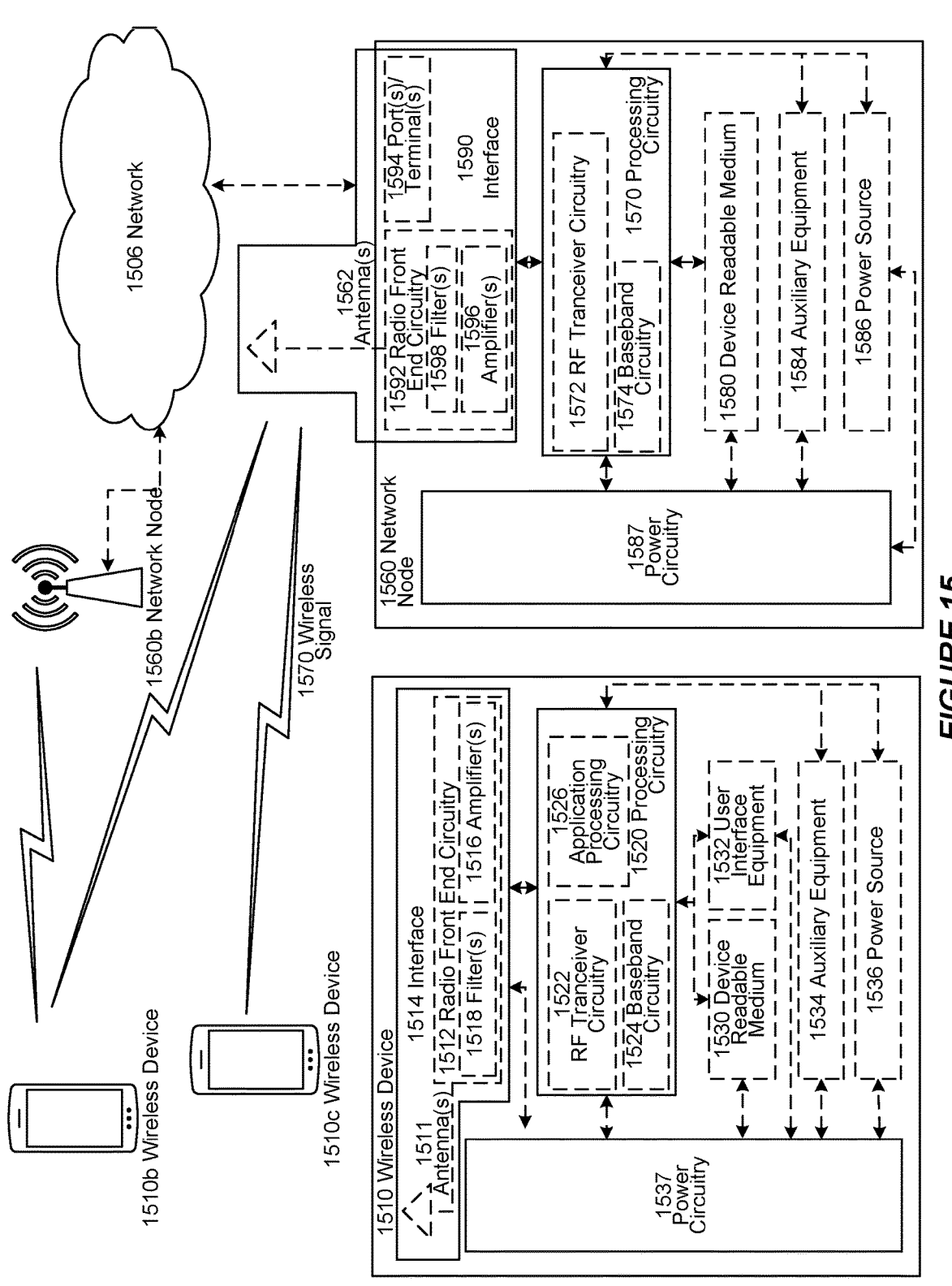
FIG. 15 is a block diagram of a wireless communication network according to some embodiments.

Although the subject matter described herein may be implemented in any appropriate type of system using any suitable components, the embodiments disclosed herein are described in relation to a wireless network, such as the example wireless network illustrated in FIG. 15. For simplicity, the wireless network of FIG. 15 only depicts network 1506, network nodes 1560 and 1560*b*, and WDs 1510, 1510*b*, and 1510*c*. In practice, a wireless network may further include any additional elements suitable to support communication between wireless devices or between a wireless device and another communication device, such as a landline telephone, a service provider, or any other network node or end device. Of the illustrated components, network node 1560 and wireless device (WD) 1510 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1506 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1560 and WD 1510 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 15, network node 1560 includes processing circuitry 1570, device readable medium 1580, interface 1590, auxiliary equipment 1584, power source 1586, power circuitry 1587, and antenna 1562. Although network node 1560 illustrated in the example wireless network of FIG. 15 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1560 are depicted as single boxes located within a larger box, or nested within multiple boxes, in practice, a network node may comprise multiple different physical components that make up a single illustrated component (e.g., device readable medium 1580 may comprise multiple separate hard drives as well as multiple RAM modules).

Similarly, network node 1560 may be composed of multiple physically separate components (e.g., a NodeB component and a RNC component, or a BTS component and a BSC component, etc.), which may each have their own respective components. In certain scenarios in which network node 1560 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1560 may be configured to support multiple radio access technologies (RATs). In such embodiments, some components may be duplicated (e.g., separate device readable medium

1580 for the different RATs) and some components may be reused (e.g., the same antenna 1562 may be shared by the RATs). Network node 1560 may also include multiple sets of the various illustrated components for different wireless technologies integrated into network node 1560, such as, for example, GSM, WCDMA, LTE, NR, WiFi, or Bluetooth wireless technologies. These wireless technologies may be integrated into the same or different chip or set of chips and other components within network node 1560.

Processing circuitry 1570 is configured to perform any determining, calculating, or similar operations (e.g., certain obtaining operations) described herein as being provided by a network node. These operations performed by processing circuitry 1570 may include processing information obtained by processing circuitry 1570 by, for example, converting the obtained information into other information, comparing the obtained information or converted information to information stored in the network node, and/or performing one or more operations based on the obtained information or converted information, and as a result of said processing making a determination.

Processing circuitry 1570 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1560 components, such as device readable medium 1580, network node 1560 functionality. For example, processing circuitry 1570 may execute instructions stored in device readable medium 1580 or in memory within processing circuitry 1570. Such functionality may include providing any of the various wireless features, functions, or benefits discussed herein. In some embodiments, processing circuitry 1570 may include a system on a chip (SOC).

In some embodiments, processing circuitry 1570 may include one or more of radio frequency (RF) transceiver circuitry 1572 and baseband processing circuitry 1574. In some embodiments, radio frequency (RF) transceiver circuitry 1572 and baseband processing circuitry 1574 may be on separate chips (or sets of chips), boards, or units, such as radio units and digital units. In alternative embodiments, part or all of RF transceiver circuitry 1572 and baseband processing circuitry 1574 may be on the same chip or set of chips, boards, or units In certain embodiments, some or all of the functionality described herein as being provided by a network node, base station, eNB or other such network device may be performed by processing circuitry 1570 executing instructions stored on device readable medium 1580 or memory within processing circuitry 1570. In alternative embodiments, some or all of the functionality may be provided by processing circuitry 1570 without executing instructions stored on a separate or discrete device readable medium, such as in a hard-wired manner. In any of those embodiments, whether executing instructions stored on a device readable storage medium or not, processing circuitry 1570 can be configured to perform the described functionality. The benefits provided by such functionality are not limited to processing circuitry 1570 alone or to other components of network node 1560, but are enjoyed by network node 1560 as a whole, and/or by end users and the wireless network generally.

Device readable medium 1580 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1570. Device readable medium 1580 may store any suitable instructions, data or information, including a computer program, software, an application including one or more of logic, rules, code, tables, etc. and/or other instructions capable of being executed by processing circuitry 1570 and, utilized by network node 1560. Device readable medium 1580 may be used to store any calculations made by processing circuitry 1570 and/or any data received via interface 1590. In some embodiments, processing circuitry 1570 and device readable medium 1580 may be considered to be integrated.

Interface 1590 is used in the wired or wireless communication of signalling and/or data between network node 1560, network 1506, and/or WDs 1510. As illustrated, interface 1590 comprises port(s)/terminal(s) 1594 to send and receive data, for example to and from network 1506 over a wired connection. Interface 1590 also includes radio front end circuitry 1592 that may be coupled to, or in certain embodiments a part of, antenna 1562. Radio front end circuitry 1592 comprises filters 1598 and amplifiers 1596. Radio front end circuitry 1592 may be connected to antenna 1562 and processing circuitry 1570. Radio front end circuitry may be configured to condition signals communicated between antenna 1562 and processing circuitry 1570. Radio front end circuitry 1592 may receive digital data that is to be sent out to other network nodes or WDs via a wireless connection. Radio front end circuitry 1592 may convert the digital data into a radio signal having the appropriate channel and bandwidth parameters using a combination of filters 1598 and/or amplifiers 1596. The radio signal may then be transmitted via antenna 1562. Similarly, when receiving data, antenna 1562 may collect radio signals which are then converted into digital data by radio front end circuitry 1592. The digital data may be passed to processing circuitry 1570. In other embodiments, the interface may comprise different components and/or different combinations of components.

In certain alternative embodiments, network node 1560 may not include separate radio front end circuitry 1592, instead, processing circuitry 1570 may comprise radio front end circuitry and may be connected to antenna 1562 without separate radio front end circuitry 1592. Similarly, in some embodiments, all or some of RF transceiver circuitry 1572 may be considered a part of interface 1590. In still other embodiments, interface 1590 may include one or more ports or terminals 1594, radio front end circuitry 1592, and RF transceiver circuitry 1572, as part of a radio unit (not shown), and interface 1590 may communicate with baseband processing circuitry 1574, which is part of a digital unit (not shown).

Antenna 1562 may include one or more antennas, or antenna arrays, configured to send and/or receive wireless signals. Antenna 1562 may be coupled to radio front end circuitry 1590 and may be any type of antenna capable of transmitting and receiving data and/or signals wirelessly. In some embodiments, antenna 1562 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1562 may be separate from network node 1560 and may be connectable to network node 1560 through an interface or port.

Antenna 1562, interface 1590, and/or processing circuitry 1570 may be configured to perform any receiving operations and/or certain obtaining operations described herein as being performed by a network node. Any information, data and/or signals may be received from a wireless device, another network node and/or any other network equipment. Similarly, antenna 1562, interface 1590, and/or processing circuitry 1570 may be configured to perform any transmitting operations described herein as being performed by a network node. Any information, data and/or signals may be transmitted to a wireless device, another network node and/or any other network equipment.

Power circuitry 1587 may comprise, or be coupled to, power management circuitry and is configured to supply the components of network node 1560 with power for performing the functionality described herein. Power circuitry 1587 may receive power from power source 1586. Power source 1586 and/or power circuitry 1587 may be configured to provide power to the various components of network node 1560 in a form suitable for the respective components (e.g., at a voltage and current level needed for each respective component). Power source 1586 may either be included in, or external to, power circuitry 1587 and/or network node 1560. For example, network node 1560 may be connectable to an external power source (e.g., an electricity outlet) via an input circuitry or interface such as an electrical cable, whereby the external power source supplies power to power circuitry 1587. As a further example, power source 1586 may comprise a source of power in the form of a battery or battery pack which is connected to, or integrated in, power circuitry 1587. The battery may provide backup power should the external power source fail. Other types of power sources, such as photovoltaic devices, may also be used.

Alternative embodiments of network node 1560 may include additional components beyond those shown in FIG. 15 that may be responsible for providing certain aspects of the network node's functionality, including any of the functionality described herein and/or any functionality necessary to support the subject matter described herein. For example, network node 1560 may include user interface equipment to allow input of information into network node 1560 and to allow output of information from network node 1560. This may allow a user to perform diagnostic, maintenance, repair, and other administrative functions for network node 1560.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1510 includes antenna 1511, interface 1514, processing circuitry 1520, device readable medium 1530, user interface equipment 1532, auxiliary equipment 1534, power source 1536 and power circuitry 1537. WD 1510 may include multiple sets of one or more of the illustrated components for different wireless technologies supported by WD 1510, such as, for example, GSM, WCDMA, LTE, NR, WiFi, WiMAX, NB-IoT, or Bluetooth wireless technologies, just to mention a few. These wireless technologies may be integrated into the same or different chips or set of chips as other components within WD 1510.

Antenna 1511 may include one or more antennas or antenna arrays, configured to send and/or receive wireless signals, and is connected to interface 1514. In certain alternative embodiments, antenna 1511 may be separate from WD 1510 and be connectable to WD 1510 through an interface or port. Antenna 1511, interface 1514, and/or processing circuitry 1520 may be configured to perform any receiving or transmitting operations described herein as being performed by a WD. Any information, data and/or signals may be received from a network node and/or another WD. In some embodiments, radio front end circuitry and/or antenna 1511 may be considered an interface.

As illustrated, interface 1514 comprises radio front end circuitry 1512 and antenna 1511. Radio front end circuitry 1512 comprise one or more filters 1518 and amplifiers 1516. Radio front end circuitry 1514 is connected to antenna 1511 and processing circuitry 1520, and is configured to condition signals communicated between antenna 1511 and processing circuitry 1520. Radio front end circuitry 1512 may be coupled to or a part of antenna 1511. In some embodiments, WD 1510 may not include separate radio front end circuitry 1512; rather, processing circuitry 1520 may comprise radio front end circuitry and may be connected to antenna 1511. Similarly, in some embodiments, some or all of RF transceiver circuitry 1522 may be considered a part of interface 1514. Radio front end circuitry 1512 may receive digital data that is to be sent out to other network nodes or WDs via a wireless connection. Radio front end circuitry 1512 may convert the digital data into a radio signal having the appropriate channel and bandwidth parameters using a combination of filters 1518 and/or amplifiers 1516. The radio signal may then be transmitted via antenna 1511. Similarly, when receiving data, antenna 1511 may collect radio signals which are then converted into digital data by radio front end circuitry 1512. The digital data may be passed to processing circuitry 1520. In other embodiments, the interface may comprise different components and/or different combinations of components.

Processing circuitry 1520 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1510 components, such as device readable medium 1530, WD 1510 functionality. Such functionality may include providing any of the various wireless features or benefits discussed herein. For example, processing circuitry 1520 may execute instructions stored in device readable medium 1530 or in memory within processing circuitry 1520 to provide the functionality disclosed herein.

As illustrated, processing circuitry 1520 includes one or more of RF transceiver circuitry 1522, baseband processing circuitry 1524, and application processing circuitry 1526. In other embodiments, the processing circuitry may comprise different components and/or different combinations of components. In certain embodiments processing circuitry 1520 of WD 1510 may comprise a SOC. In some embodiments, RF transceiver circuitry 1522, baseband processing circuitry 1524, and application processing circuitry 1526 may be on separate chips or sets of chips. In alternative embodiments, part or all of baseband processing circuitry 1524 and application processing circuitry 1526 may be combined into one chip or set of chips, and RF transceiver circuitry 1522 may be on a separate chip or set of chips. In still alternative embodiments, part or all of RF transceiver circuitry 1522 and baseband processing circuitry 1524 may be on the same chip or set of chips, and application processing circuitry 1526 may be on a separate chip or set of chips. In yet other alternative embodiments, part or all of RF transceiver circuitry 1522, baseband processing circuitry 1524, and application processing circuitry 1526 may be combined in the same chip or set of chips. In some embodiments, RF transceiver circuitry 1522 may be a part of interface 1514. RF transceiver circuitry 1522 may condition RF signals for processing circuitry 1520.

In certain embodiments, some or all of the functionality described herein as being performed by a WD may be provided by processing circuitry 1520 executing instructions stored on device readable medium 1530, which in certain embodiments may be a computer-readable storage medium. In alternative embodiments, some or all of the functionality may be provided by processing circuitry 1520 without executing instructions stored on a separate or discrete device readable storage medium, such as in a hard-wired manner. In any of those particular embodiments, whether executing instructions stored on a device readable storage medium or not, processing circuitry 1520 can be configured to perform the described functionality. The benefits provided by such functionality are not limited to processing circuitry 1520 alone or to other components of WD 1510, but are enjoyed by WD 1510 as a whole, and/or by end users and the wireless network generally.

Processing circuitry 1520 may be configured to perform any determining, calculating, or similar operations (e.g., certain obtaining operations) described herein as being performed by a WD. These operations, as performed by processing circuitry 1520, may include processing information obtained by processing circuitry 1520 by, for example, converting the obtained information into other information, comparing the obtained information or converted information to information stored by WD 1510, and/or performing one or more operations based on the obtained information or converted information, and as a result of said processing making a determination.

Device readable medium 1530 may be operable to store a computer program, software, an application including one or more of logic, rules, code, tables, etc. and/or other instructions capable of being executed by processing circuitry 1520. Device readable medium 1530 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1520. In some embodiments, processing circuitry 1520 and device readable medium 1530 may be considered to be integrated.

User interface equipment 1532 may provide components that allow for a human user to interact with WD 1510. Such interaction may be of many forms, such as visual, audial, tactile, etc. User interface equipment 1532 may be operable to produce output to the user and to allow the user to provide input to WD 1510. The type of interaction may vary depending on the type of user interface equipment 1532 installed in WD 1510. For example, if WD 1510 is a smart phone, the interaction may be via a touch screen; if WD 1510 is a smart meter, the interaction may be through a screen that provides usage (e.g., the number of gallons used) or a speaker that provides an audible alert (e.g., if smoke is detected). User interface equipment 1532 may include input interfaces, devices and circuits, and output interfaces, devices and circuits. User interface equipment 1532 is configured to allow input of information into WD 1510, and is connected to processing circuitry 1520 to allow processing circuitry 1520 to process the input information. User interface equipment 1532 may include, for example, a microphone, a proximity or other sensor, keys/buttons, a touch display, one or more cameras, a USB port, or other input circuitry. User interface equipment 1532 is also configured to allow output of information from WD 1510, and to allow processing circuitry 1520 to output information from WD 1510. User interface equipment 1532 may include, for example, a speaker, a display, vibrating circuitry, a USB port, a headphone interface, or other output circuitry. Using one or more input and output interfaces, devices, and circuits, of user interface equipment 1532, WD 1510 may communicate with end users and/or the wireless network, and allow them to benefit from the functionality described herein.

Auxiliary equipment 1534 is operable to provide more specific functionality which may not be generally performed by WDs. This may comprise specialized sensors for doing measurements for various purposes, interfaces for additional types of communication such as wired communications etc. The inclusion and type of components of auxiliary equipment 1534 may vary depending on the embodiment and/or scenario.

Power source 1536 may, in some embodiments, be in the form of a battery or battery pack. Other types of power sources, such as an external power source (e.g., an electricity outlet), photovoltaic devices or power cells, may also be used. WD 1510 may further comprise power circuitry 1537 for delivering power from power source 1536 to the various parts of WD 1510 which need power from power source 1536 to carry out any functionality described or indicated herein. Power circuitry 1537 may in certain embodiments comprise power management circuitry. Power circuitry 1537 may additionally or alternatively be operable to receive power from an external power source; in which case WD 1510 may be connectable to the external power source (such as an electricity outlet) via input circuitry or an interface such as an electrical power cable. Power circuitry 1537 may also in certain embodiments be operable to deliver power from an external power source to power source 1536. This may be, for example, for the charging of power source 1536. Power circuitry 1537 may perform any formatting, converting, or other modification to the power from power source 1536 to make the power suitable for the respective components of WD 1510 to which power is supplied.

Figure 16:
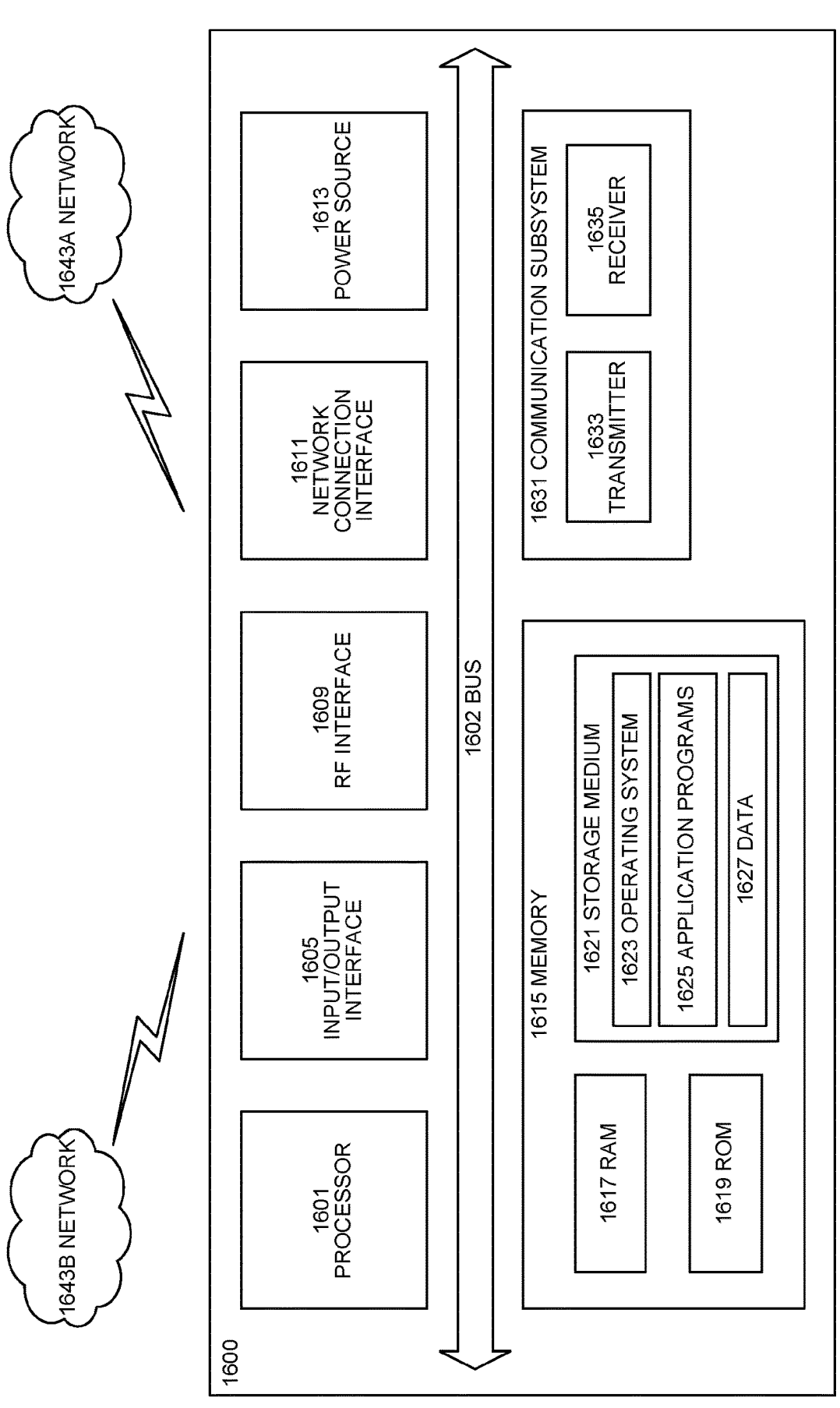
FIG. 16 is a block diagram of a user equipment according to some embodiments.

FIG. 16 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 16200 may be any UE identified by the 3$^{rd}$ Generation Partnership Project (3GPP), including a NB-IoT UE, a machine type communication (MTC) UE, and/or an enhanced MTC (eMTC) UE. UE 1600, as illustrated in FIG. 16, is one example of a WD configured for communication in accordance with one or more communication standards promulgated by the 3$^{rd}$ Generation Partnership Project (3GPP), such as 3GPP's GSM, UMTS, LTE, and/or 5G standards. As mentioned previously, the term WD and UE may be used interchangeable. Accordingly, although FIG. 16 is a UE, the components discussed herein are equally applicable to a WD, and vice-versa.

In FIG. 16, UE 1600 includes processing circuitry 1601 that is operatively coupled to input/output interface 1605, radio frequency (RF) interface 1609, network connection interface 1611, memory 1615 including random access memory (RAM) 1617, read-only memory (ROM) 1619, and storage medium 1621 or the like, communication subsystem 1631, power source 1633, and/or any other component, or any combination thereof. Storage medium 1621 includes operating system 1623, application program 1625, and data 1627. In other embodiments, storage medium 1621 may include other similar types of information. Certain UEs may utilize all of the components shown in FIG. 16, or only a subset of the components. The level of integration between the components may vary from one UE to another UE. Further, certain UEs may contain multiple instances of a component, such as multiple processors, memories, transceivers, transmitters, receivers, etc.

In FIG. 16, processing circuitry 1601 may be configured to process computer instructions and data. Processing circuitry 1601 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1601 may include two central processing units (CPUs). Data may be information in a form suitable for use by a computer.

In the depicted embodiment, input/output interface 1605 may be configured to provide a communication interface to an input device, output device, or input and output device. UE 1600 may be configured to use an output device via input/output interface 1605. An output device may use the same type of interface port as an input device. For example, a USB port may be used to provide input to and output from UE 1600. The output device may be a speaker, a sound card, a video card, a display, a monitor, a printer, an actuator, an emitter, a smartcard, another output device, or any combination thereof. UE 1600 may be configured to use an input device via input/output interface 1605 to allow a user to capture information into UE 1600. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 16, RF interface 1609 may be configured to provide a communication interface to RF components such as a transmitter, a receiver, and an antenna. Network connection interface 1611 may be configured to provide a communication interface to network 1643$a$. Network 1643$a$ may encompass wired and/or wireless networks such as a local-area network (LAN), a wide-area network (WAN), a computer network, a wireless network, a telecommunications network, another like network or any combination thereof. For example, network 1643$a$ may comprise a Wi-Fi network. Network connection interface 1611 may be configured to include a receiver and a transmitter interface used to communicate with one or more other devices over a communication network according to one or more communication protocols, such as Ethernet, TCP/IP, SON ET, ATM, or the like. Network connection interface 1611 may implement receiver and transmitter functionality appropriate to the communication network links (e.g., optical, electrical, and the like). The transmitter and receiver functions may share circuit components, software or firmware, or alternatively may be implemented separately.

RAM 1617 may be configured to interface via bus 1602 to processing circuitry 1601 to provide storage or caching of data or computer instructions during the execution of software programs such as the operating system, application programs, and device drivers. ROM 1619 may be configured to provide computer instructions or data to processing circuitry 1601. For example, ROM 1619 may be configured to store invariant low-level system code or data for basic system functions such as basic input and output (I/O), startup, or reception of keystrokes from a keyboard that are stored in a non-volatile memory. Storage medium 1621 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1621 may be configured to include operating system 1623, application program 1625 such as a web browser application, a widget or gadget engine or another application, and data file 1627. Storage medium 1621 may store, for use by UE 1600, any of a variety of various operating systems or combinations of operating systems.

Storage medium 1621 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1621 may allow UE 1600 to access computer-executable instructions, application programs or the like, stored on transitory or non-transitory memory media, to off-load data, or to upload data. An article of manufacture, such as one utilizing a communication system may be tangibly embodied in storage medium 1621, which may comprise a device readable medium.

In FIG. 16, processing circuitry 1601 may be configured to communicate with network 1643*b* using communication subsystem 1631. Network 1643*a* and network 1643*b* may be the same network or networks or different network or networks. Communication subsystem 1631 may be configured to include one or more transceivers used to communicate with network 1643*b*. For example, communication subsystem 1631 may be configured to include one or more transceivers used to communicate with one or more remote transceivers of another device capable of wireless communication such as another WD, UE, or base station of a radio access network (RAN) according to one or more communication protocols, such as IEEE 802.16, CDMA, WCDMA, GSM, LTE, UTRAN, WiMax, or the like. Each transceiver may include transmitter 1633 and/or receiver 1635 to implement transmitter or receiver functionality, respectively, appropriate to the RAN links (e.g., frequency allocations and the like). Further, transmitter 1633 and receiver 1635 of each transceiver may share circuit components, software or firmware, or alternatively may be implemented separately.

In the illustrated embodiment, the communication functions of communication subsystem 1631 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1631 may include cellular communication, Wi-Fi communication, Bluetooth communication, and GPS communication. Network 1643*b* may encompass wired and/or wireless networks such as a local-area network (LAN), a wide-area network (WAN), a computer network, a wireless network, a telecommunications network, another like network or any combination thereof. For example, network 1643*b* may be a cellular network, a Wi-Fi network, and/or a near-field network. Power source 1613 may be configured to provide alternating current (AC) or direct current (DC) power to components of UE 1600.

The features, benefits and/or functions described herein may be implemented in one of the components of UE 1600 or partitioned across multiple components of UE 1600. Further, the features, benefits, and/or functions described herein may be implemented in any combination of hardware, software or firmware. In one example, communication subsystem 1631 may be configured to include any of the components described herein. Further, processing circuitry 1601 may be configured to communicate with any of such components over bus 1602. In another example, any of such components may be represented by program instructions stored in memory that when executed by processing circuitry 1601 perform the corresponding functions described herein. In another example, the functionality of any of such components may be partitioned between processing circuitry 1601 and communication subsystem 1631. In another example, the non-computationally intensive functions of any of such components may be implemented in software or firmware and the computationally intensive functions may be implemented in hardware.

Figure 17:
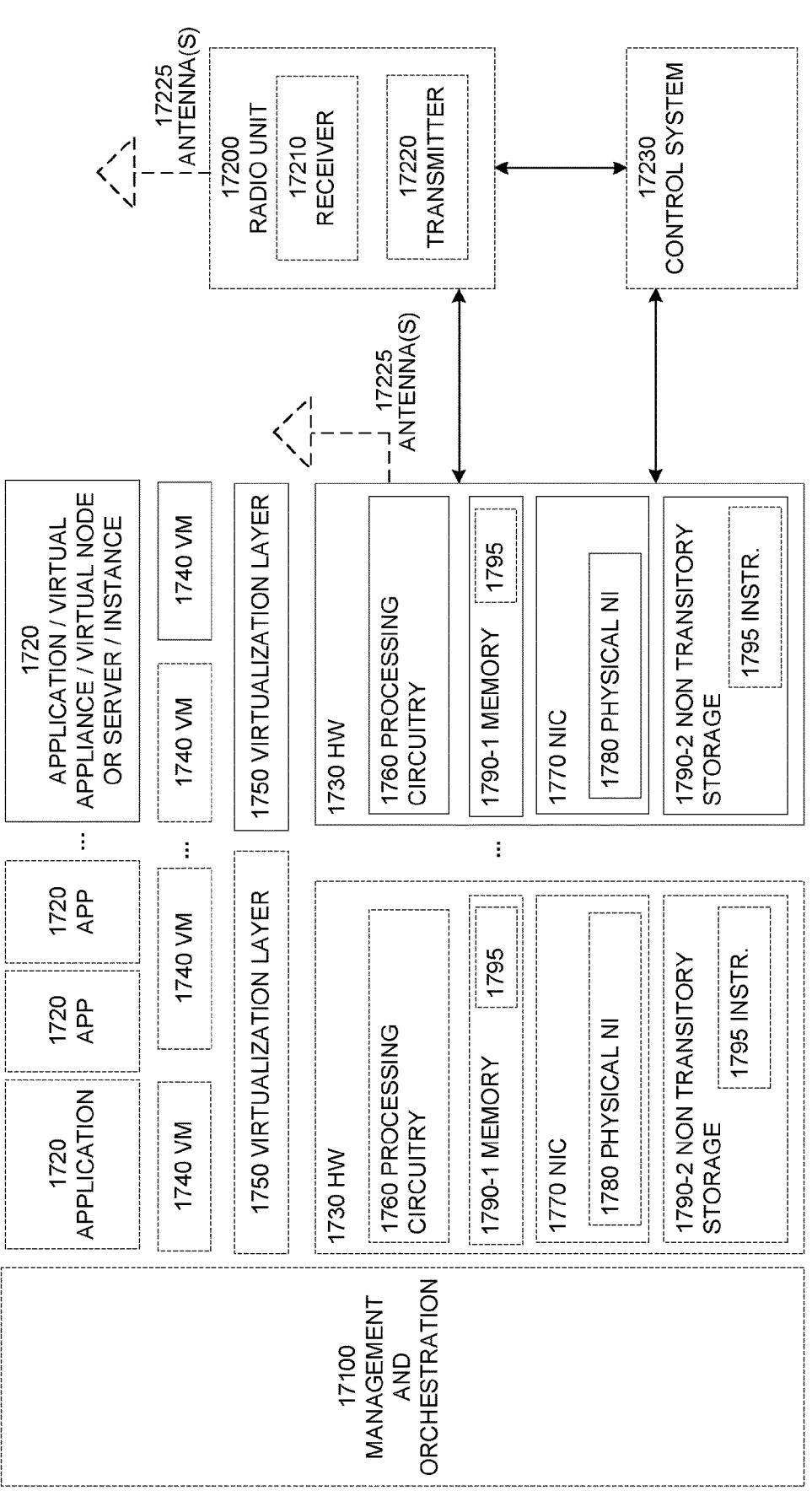
FIG. 17 is a block diagram of a virtualization environment according to some embodiments.

FIG. 17 is a schematic block diagram illustrating a virtualization environment 1700 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1700 hosted by one or more of hardware nodes 1730. Further, in embodiments in which the virtual node is not a radio access node or does not require radio connectivity (e.g., a core network node), then the network node may be entirely virtualized.

The functions may be implemented by one or more applications 1720 (which may alternatively be called software instances, virtual appliances, network functions, virtual nodes, virtual network functions, etc.) operative to implement some of the features, functions, and/or benefits of some of the embodiments disclosed herein. Applications 1720 are run in virtualization environment 1700 which provides hardware 1730 comprising processing circuitry 1760 and memory 1790. Memory 1790 contains instructions 1795 executable by processing circuitry 1760 whereby application 1720 is operative to provide one or more of the features, benefits, and/or functions disclosed herein.

Virtualization environment 1700, comprises general-purpose or special-purpose network hardware devices 1730 comprising a set of one or more processors or processing circuitry 1760, which may be commercial off-the-shelf (COTS) processors, dedicated Application Specific Integrated Circuits (ASICs), or any other type of processing circuitry including digital or analog hardware components or special purpose processors. Each hardware device may comprise memory 1790-1 which may be non-persistent memory for temporarily storing instructions 1795 or software executed by processing circuitry 1760. Each hardware device may comprise one or more network interface controllers (NICs) 1770, also known as network interface cards, which include physical network interface 1780. Each hardware device may also include non-transitory, persistent, machine-readable storage media 1790-2 having stored therein software 1795 and/or instructions executable by processing circuitry 1760. Software 1795 may include any type of software including software for instantiating one or more virtualization layers 1750 (also referred to as hypervisors), software to execute virtual machines 1740 as well as software allowing it to execute functions, features and/or benefits described in relation with some embodiments described herein.

Virtual machines 1740, comprise virtual processing, virtual memory, virtual networking or interface and virtual storage, and may be run by a corresponding virtualization layer 1750 or hypervisor. Different embodiments of the instance of virtual appliance 1720 may be implemented on one or more of virtual machines 1740, and the implementations may be made in different ways.

During operation, processing circuitry 1760 executes software 1795 to instantiate the hypervisor or virtualization layer 1750, which may sometimes be referred to as a virtual machine monitor (VMM). Virtualization layer 1750 may present a virtual operating platform that appears like networking hardware to virtual machine 1740.

As shown in FIG. 17, hardware 1730 may be a standalone network node with generic or specific components. Hardware 1730 may comprise antenna 17225 and may implement some functions via virtualization. Alternatively, hardware 1730 may be part of a larger cluster of hardware (e.g. such as in a data center or customer premise equipment (CPE)) where many hardware nodes work together and are managed via management and orchestration (MANO) 17100, which, among others, oversees lifecycle management of applications 1720.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1740 may be a software implementation of a physical machine that runs programs as if they were executing on a physical, non-virtualized machine. Each of virtual machines 1740, and that part of hardware 1730 that executes that virtual machine, be it hardware dedicated to that virtual machine and/or hardware shared by that virtual machine with others of the virtual machines 1740, forms a separate virtual network elements (VNE).

Still in the context of NFV, Virtual Network Function (VNF) is responsible for handling specific network functions that run in one or more virtual machines 1740 on top of hardware networking infrastructure 1730 and corresponds to application 1720 in FIG. 17.

In some embodiments, one or more radio units 17200 that each include one or more transmitters 17220 and one or more receivers 17210 may be coupled to one or more antennas 17225. Radio units 17200 may communicate directly with hardware nodes 1730 via one or more appropriate network interfaces and may be used in combination with the virtual components to provide a virtual node with radio capabilities, such as a radio access node or a base station.

In some embodiments, some signalling can be effected with the use of control system 17230 which may alternatively be used for communication between the hardware nodes 1730 and radio units 17200.

Figure 18:
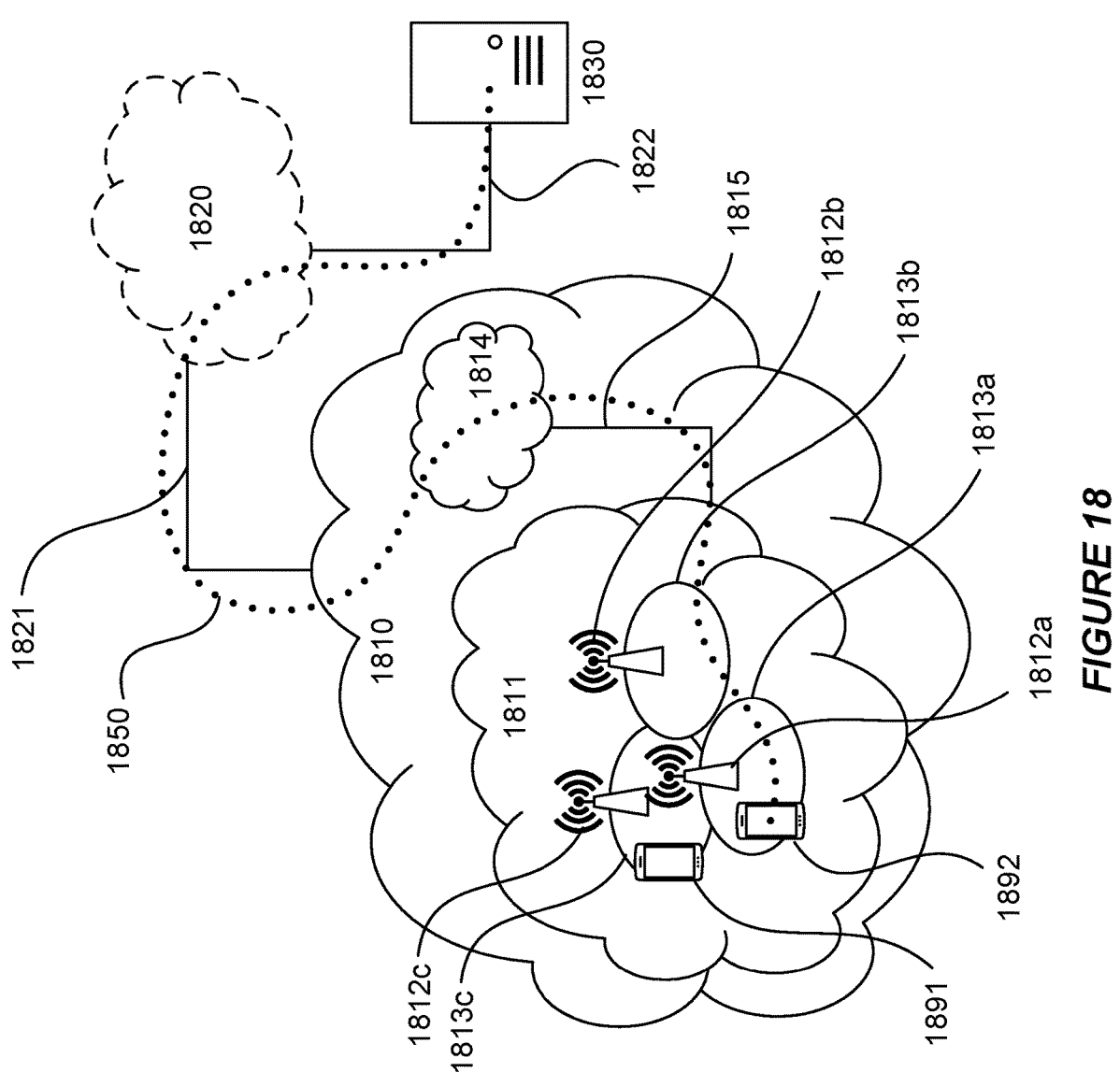
FIG. 18 is a block diagram of a communication network with a host computer according to some embodiments.

FIG. 18 illustrates a telecommunication network connected via an intermediate network to a host computer in accordance with some embodiments. In particular, with reference to FIG. 18, in accordance with an embodiment, a communication system includes telecommunication network 1810, such as a 3GPP-type cellular network, which comprises access network 1811, such as a radio access network, and core network 1814. Access network 1811 comprises a plurality of base stations 1812a, 1812b, 1812c, such as NBs, eNBs, gNBs or other types of wireless access points, each defining a corresponding coverage area 1813a, 1813b, 1813c. Each base station 1812a, 1812b, 1812c is connectable to core network 1814 over a wired or wireless connection 1815. A first UE 1891 located in coverage area 1813c is configured to wirelessly connect to, or be paged by, the corresponding base station 1812c. A second UE 1892 in coverage area 1813a is wirelessly connectable to the corresponding base station 1812a. While a plurality of UEs 1891, 1892 are illustrated in this example, the disclosed embodiments are equally applicable to a situation where a sole UE is in the coverage area or where a sole UE is connecting to the corresponding base station 1812.

Telecommunication network 1810 is itself connected to host computer 1830, which may be embodied in the hardware and/or software of a standalone server, a cloud-implemented server, a distributed server or as processing resources in a server farm. Host computer 1830 may be under the ownership or control of a service provider, or may be operated by the service provider or on behalf of the service provider. Connections 1821 and 1822 between telecommunication network 1810 and host computer 1830 may extend directly from core network 1814 to host computer 1830 or may go via an optional intermediate network 1820. Intermediate network 1820 may be one of, or a combination of more than one of, a public, private or hosted network; intermediate network 1820, if any, may be a backbone network or the Internet; in particular, intermediate network 1820 may comprise two or more sub-networks (not shown).

The communication system of FIG. 18 as a whole enables connectivity between the connected UEs 1891, 1892 and host computer 1830. The connectivity may be described as an over-the-top (OTT) connection 1850. Host computer 1830 and the connected UEs 1891, 1892 are configured to communicate data and/or signaling via OTT connection 1850, using access network 1811, core network 1814, any intermediate network 1820 and possible further infrastructure (not shown) as intermediaries. OTT connection 1850 may be transparent in the sense that the participating communication devices through which OTT connection 1850 passes are unaware of routing of uplink and downlink communications. For example, base station 1812 may not or need not be informed about the past routing of an incoming downlink communication with data originating from host computer 1830 to be forwarded (e.g., handed over) to a connected UE 1891. Similarly, base station 1812 need not be aware of the future routing of an outgoing uplink communication originating from the UE 1891 towards the host computer 1830.

Figure 19:
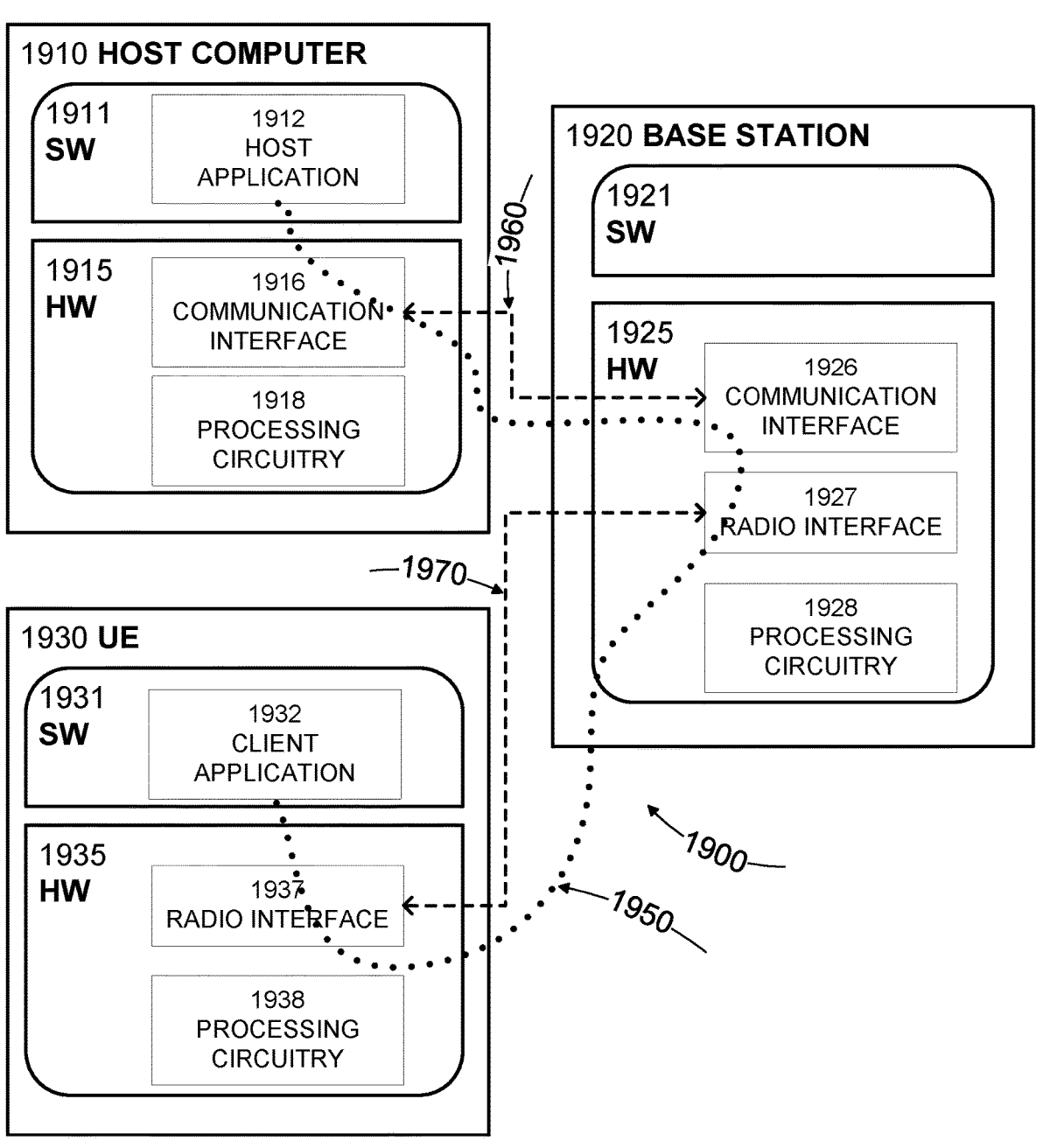
FIG. 19 is a block diagram of a host computer according to some embodiments.

Example implementations, in accordance with an embodiment, of the UE, base station and host computer discussed in the preceding paragraphs will now be described with reference to FIG. 19. FIG. 19 illustrates host computer communicating via a base station with a user equipment over a partially wireless connection in accordance with some embodiments In communication system 1900, host computer 1910 comprises hardware 1915 including communication interface 1916 configured to set up and maintain a wired or wireless connection with an interface of a different communication device of communication system 1900. Host computer 1910 further comprises processing circuitry 1918, which may have storage and/or processing capabilities. In particular, processing circuitry 1918 may comprise one or more programmable processors, application-specific integrated circuits, field programmable gate arrays or combinations of these (not shown) adapted to execute instructions. Host computer 1910 further comprises software 1911, which is stored in or accessible by host computer 1910 and executable by processing circuitry 1918. Software 1911 includes host application 1912. Host application 1912 may be operable to provide a service to a remote user, such as UE 1930 connecting via OTT connection 1950 terminating at UE 1930 and host computer 1910. In providing the service to the remote user, host application 1912 may provide user data which is transmitted using OTT connection 1950.

Communication system 1900 further includes base station 1920 provided in a telecommunication system and comprising hardware 1925 enabling it to communicate with host computer 1910 and with UE 1930. Hardware 1925 may include communication interface 1926 for setting up and maintaining a wired or wireless connection with an interface of a different communication device of communication system 1900, as well as radio interface 1927 for setting up and maintaining at least wireless connection 1970 with UE 1930 located in a coverage area (not shown in FIG. 19) served by base station 1920. Communication interface 1926 may be configured to facilitate connection 1960 to host computer 1910. Connection 1960 may be direct or it may pass through a core network (not shown in FIG. 19) of the telecommunication system and/or through one or more intermediate networks outside the telecommunication system. In the embodiment shown, hardware 1925 of base station 1920 further includes processing circuitry 1928, which may comprise one or more programmable processors, application-specific integrated circuits, field programmable gate arrays or combinations of these (not shown) adapted to execute instructions. Base station 1920 further has software 1921 stored internally or accessible via an external connection.

Communication system 1900 further includes UE 1930 already referred to. Its hardware 1935 may include radio interface 1937 configured to set up and maintain wireless connection 1970 with a base station serving a coverage area in which UE 1930 is currently located. Hardware 1935 of UE 1930 further includes processing circuitry 1938, which may comprise one or more programmable processors, application-specific integrated circuits, field programmable gate arrays or combinations of these (not shown) adapted to execute instructions. UE 1930 further comprises software 1931, which is stored in or accessible by UE 1930 and executable by processing circuitry 1938. Software 1931 includes client application 1932. Client application 1932 may be operable to provide a service to a human or non-human user via UE 1930, with the support of host computer 1910. In host computer 1910, an executing host application 1912 may communicate with the executing client application 1932 via OTT connection 1950 terminating at UE 1930 and host computer 1910. In providing the service to the user, client application 1932 may receive request data from host application 1912 and provide user data in response to the request data. OTT connection 1950 may transfer both the request data and the user data. Client application 1932 may interact with the user to generate the user data that it provides.

It is noted that host computer 1910, base station 1920 and UE 1930 illustrated in FIG. 19 may be similar or identical to host computer 1830, one of base stations 1812a, 1812b, 1812c and one of UEs 1891, 1892 of FIG. 18, respectively. This is to say, the inner workings of these entities may be as shown in FIG. 19 and independently, the surrounding network topology may be that of FIG. 18.

In FIG. 19, OTT connection 1950 has been drawn abstractly to illustrate the communication between host computer 1910 and UE 1930 via base station 1920, without explicit reference to any intermediary devices and the precise routing of messages via these devices. Network infrastructure may determine the routing, which it may be configured to hide from UE 1930 or from the service provider operating host computer 1910, or both. While OTT connection 1950 is active, the network infrastructure may further take decisions by which it dynamically changes the routing (e.g., on the basis of load balancing consideration or reconfiguration of the network).

Wireless connection 1970 between UE 1930 and base station 1920 is in accordance with the teachings of the embodiments described throughout this disclosure. One or more of the various embodiments improve the performance of OTT services provided to UE 1930 using OTT connection 1950, in which wireless connection 1970 forms the last segment.

A measurement procedure may be provided for the purpose of monitoring data rate, latency and other factors on which the one or more embodiments improve. There may further be an optional network functionality for reconfiguring OTT connection 1950 between host computer 1910 and UE 1930, in response to variations in the measurement results. The measurement procedure and/or the network functionality for reconfiguring OTT connection 1950 may be implemented in software 1911 and hardware 1915 of host computer 1910 or in software 1931 and hardware 1935 of UE 1930, or both. In embodiments, sensors (not shown) may be deployed in or in association with communication devices through which OTT connection 1950 passes; the sensors may participate in the measurement procedure by supplying values of the monitored quantities exemplified above, or supplying values of other physical quantities from which software 1911, 1931 may compute or estimate the monitored quantities. The reconfiguring of OTT connection 1950 may include message format, retransmission settings, preferred routing etc.; the reconfiguring need not affect base station 1920, and it may be unknown or imperceptible to base station 1920. Such procedures and functionalities may be known and practiced in the art. In certain embodiments, measurements may involve proprietary UE signaling facilitating host computer 1910's measurements of throughput, propagation times, latency and the like. The measurements may be implemented in that software 1911 and 1931 causes messages to be transmitted, in particular empty or 'dummy' messages, using OTT connection 1950 while it monitors propagation times, errors etc.

Figure 20:
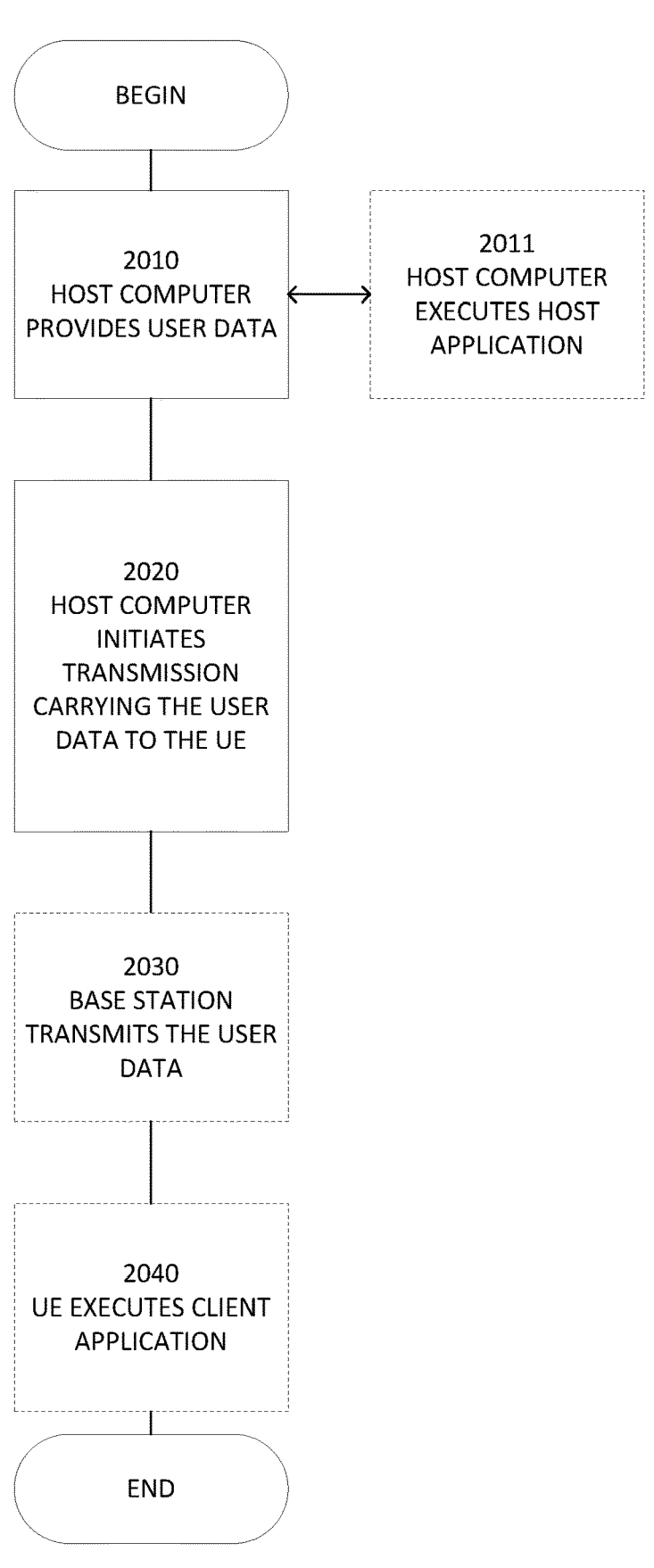
FIG. 20 is a flowchart illustrating a method implemented in a communication system, in accordance with one embodiment.

FIG. 20 is a flowchart illustrating a method implemented in a communication system, in accordance with one embodiment. The communication system includes a host computer, a base station and a UE which may be those described with reference to FIGS. 18 and 19. For simplicity of the present disclosure, only drawing references to FIG. 20 will be included in this section. In step 2010, the host computer provides user data. In substep 2011 (which may be optional) of step 2010, the host computer provides the user data by executing a host application. In step 2020, the host computer initiates a transmission carrying the user data to the UE. In step 2030 (which may be optional), the base station transmits to the UE the user data which was carried in the transmission that the host computer initiated, in accordance with the teachings of the embodiments described throughout this disclosure. In step 2040 (which may also be optional), the UE executes a client application associated with the host application executed by the host computer.

Figure 21:
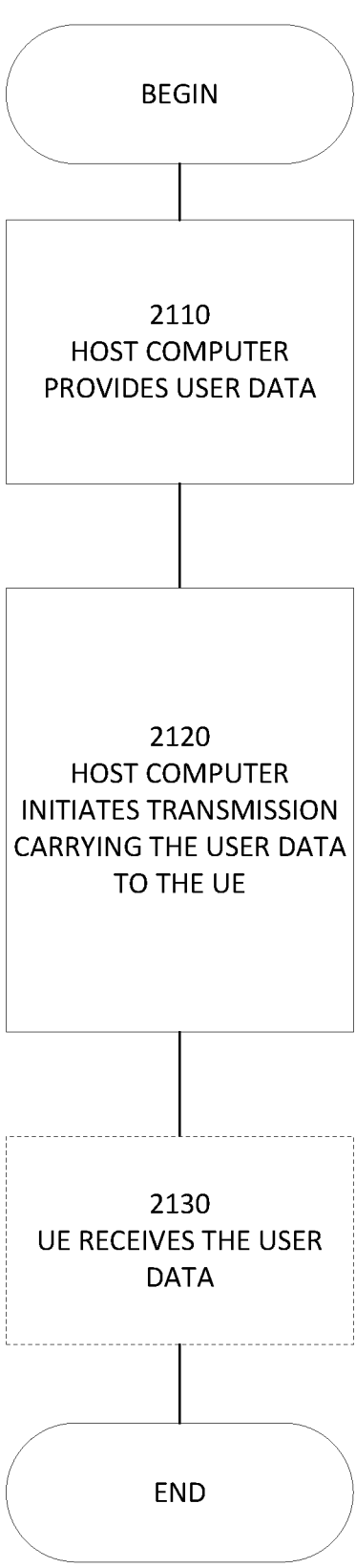
FIG. 21 is a flowchart illustrating a method implemented in a communication system, in accordance with one embodiment.

FIG. 21 is a flowchart illustrating a method implemented in a communication system, in accordance with one embodiment. The communication system includes a host computer, a base station and a UE which may be those described with reference to FIGS. 18 and 19. For simplicity of the present disclosure, only drawing references to FIG. 21 will be included in this section. In step 2110 of the method, the host computer provides user data. In an optional substep (not shown) the host computer provides the user data by executing a host application. In step 2120, the host computer initiates a transmission carrying the user data to the UE. The transmission may pass via the base station, in accordance with the teachings of the embodiments described throughout this disclosure. In step 2130 (which may be optional), the UE receives the user data carried in the transmission.

Figure 22:
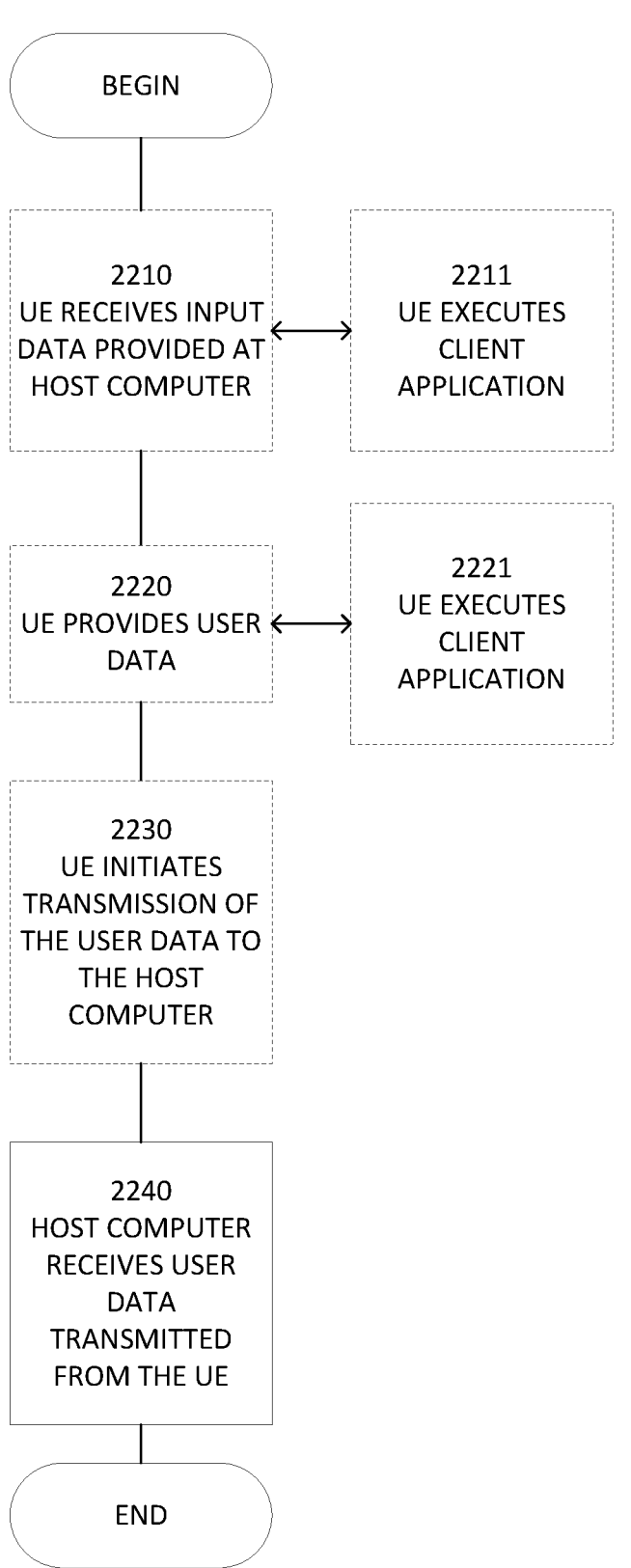
FIG. 22 is a flowchart illustrating a method implemented in a communication system, in accordance with one embodiment.

FIG. 22 is a flowchart illustrating a method implemented in a communication system, in accordance with one embodiment. The communication system includes a host computer, a base station and a UE which may be those described with reference to FIGS. 18 and 19. For simplicity of the present disclosure, only drawing references to FIG. 22 will be included in this section. In step 2210 (which may be optional), the UE receives input data provided by the host computer. Additionally or alternatively, in step 2220, the UE provides user data. In substep 2221 (which may be optional) of step 2220, the UE provides the user data by executing a client application. In substep 2211 (which may be optional) of step 2210, the UE executes a client application which provides the user data in reaction to the received input data provided by the host computer. In providing the user data, the executed client application may further consider user input received from the user. Regardless of the specific manner in which the user data was provided, the UE initiates, in substep 2230 (which may be optional), transmission of the user data to the host computer. In step 2240 of the method, the host computer receives the user data transmitted from the UE, in accordance with the teachings of the embodiments described throughout this disclosure.

Figure 23:
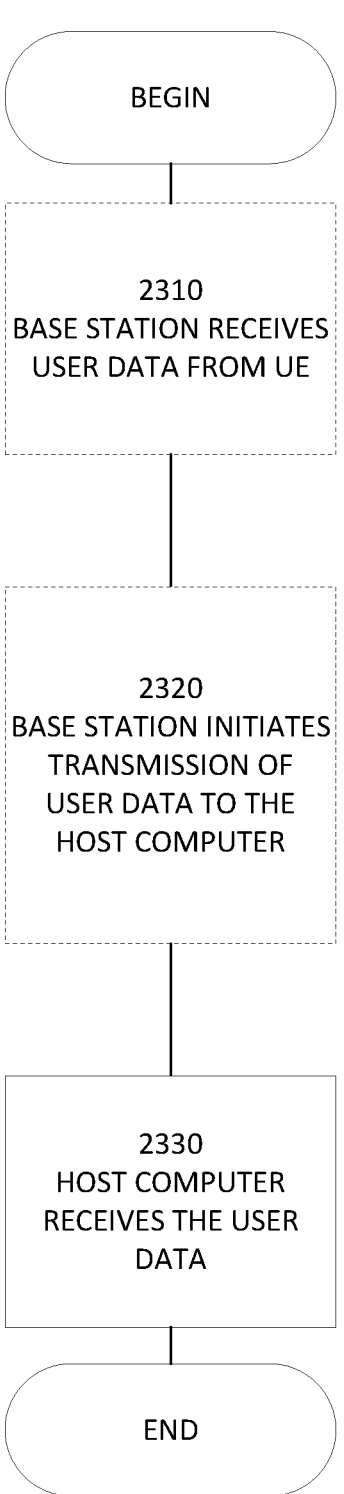
FIG. 23 is a flowchart illustrating a method implemented in a communication system, in accordance with one embodiment.

FIG. 23 is a flowchart illustrating a method implemented in a communication system, in accordance with one embodiment. The communication system includes a host computer, a base station and a UE which may be those described with reference to FIGS. 18 and 19. For simplicity of the present disclosure, only drawing references to FIG. 23 will be included in this section. In step 2310 (which may be optional), in accordance with the teachings of the embodiments described throughout this disclosure, the base station receives user data from the UE. In step 2320 (which may be optional), the base station initiates transmission of the received user data to the host computer. In step 2330 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

In view of the above, then, embodiments herein generally include a communication system including a host computer. The host computer may comprise processing circuitry configured to provide user data. The host computer may also comprise a communication interface configured to forward the user data to a cellular network for transmission to a user equipment (UE). The cellular network may comprise a base station having a radio interface and processing circuitry, the base station's processing circuitry configured to perform any of the steps of any of the embodiments described above for a base station.

In some embodiments, the communication system further includes the base station.

In some embodiments, the communication system further includes the UE, wherein the UE is configured to communicate with the base station.

In some embodiments, the processing circuitry of the host computer is configured to execute a host application, thereby providing the user data. In this case, the UE comprises processing circuitry configured to execute a client application associated with the host application.

Embodiments herein also include a method implemented in a communication system including a host computer, a base station and a user equipment (UE). The method comprises, at the host computer, providing user data. The method may also comprise, at the host computer, initiating a transmission carrying the user data to the UE via a cellular network comprising the base station. The base station performs any of the steps of any of the embodiments described above for a base station.

In some embodiments, the method further comprising, at the base station, transmitting the user data.

In some embodiments, the user data is provided at the host computer by executing a host application. In this case, the method further comprises, at the UE, executing a client application associated with the host application.

Embodiments herein also include a user equipment (UE) configured to communicate with a base station. The UE comprises a radio interface and processing circuitry configured to perform any of the embodiments above described for a UE.

Embodiments herein further include a communication system including a host computer. The host computer comprises processing circuitry configured to provide user data, and a communication interface configured to forward user data to a cellular network for transmission to a user equipment (UE). The UE comprises a radio interface and processing circuitry. The UE's components are configured to perform any of the steps of any of the embodiments described above for a UE.

In some embodiments, the cellular network further includes a base station configured to communicate with the UE.

In some embodiments, the processing circuitry of the host computer is configured to execute a host application, thereby providing the user data. The UE's processing circuitry is configured to execute a client application associated with the host application.

Embodiments also include a method implemented in a communication system including a host computer, a base station and a user equipment (UE). The method comprises, at the host computer, providing user data and initiating a transmission carrying the user data to the UE via a cellular network comprising the base station. The UE performs any of the steps of any of the embodiments described above for a UE.

In some embodiments, the method further comprises, at the UE, receiving the user data from the base station.

Embodiments herein further include a communication system including a host computer. The host computer comprises a communication interface configured to receive user data originating from a transmission from a user equipment (UE) to a base station. The UE comprises a radio interface and processing circuitry. The UE's processing circuitry is configured to perform any of the steps of any of the embodiments described above for a UE.

In some embodiments the communication system further includes the UE.

In some embodiments, the communication system further including the base station. In this case, the base station comprises a radio interface configured to communicate with the UE and a communication interface configured to forward to the host computer the user data carried by a transmission from the UE to the base station.

In some embodiments, the processing circuitry of the host computer is configured to execute a host application. And the UE's processing circuitry is configured to execute a client application associated with the host application, thereby providing the user data.

In some embodiments, the processing circuitry of the host computer is configured to execute a host application, thereby providing request data. And the UE's processing circuitry is configured to execute a client application associated with the host application, thereby providing the user data in response to the request data.

Embodiments herein also include a method implemented in a communication system including a host computer, a base station and a user equipment (UE). The method comprises, at the host computer, receiving user data transmitted to the base station from the UE. The UE performs any of the steps of any of the embodiments described above for the UE.

In some embodiments, the method further comprises, at the UE, providing the user data to the base station.

In some embodiments, the method also comprises, at the UE, executing a client application, thereby providing the user data to be transmitted. The method may further comprise, at the host computer, executing a host application associated with the client application.

In some embodiments, the method further comprises, at the UE, executing a client application, and, at the UE, receiving input data to the client application. The input data is provided at the host computer by executing a host application associated with the client application. The user data to be transmitted is provided by the client application in response to the input data.

Embodiments also include a communication system including a host computer. The host computer comprises a communication interface configured to receive user data originating from a transmission from a user equipment (UE) to a base station. The base station comprises a radio interface and processing circuitry. The base station's processing circuitry is configured to perform any of the steps of any of the embodiments described above for a base station.

In some embodiments, the communication system further includes the base station.

In some embodiments, the communication system further includes the UE. The UE is configured to communicate with the base station.

In some embodiments, the processing circuitry of the host computer is configured to execute a host application. And the UE is configured to execute a client application associated with the host application, thereby providing the user data to be received by the host computer.

Embodiments moreover include a method implemented in a communication system including a host computer, a base station and a user equipment (UE). The method comprises, at the host computer, receiving, from the base station, user data originating from a transmission which the base station has received from the UE. The UE performs any of the steps of any of the embodiments described above for a UE.

In some embodiments, the method further comprises, at the base station, receiving the user data from the UE.

In some embodiments, the method further comprises, at the base station, initiating a transmission of the received user data to the host computer.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

Example embodiments of the techniques and apparatus described herein include, but are not limited to, the following enumerated examples:

Group A Embodiments

A1. A method performed by a wireless device configured for use in a wireless communication network, the method comprising:

receiving broadcasted system information for a cell, the broadcasted system information indicating at least one of any one or more of:

multiple bandwidth parts of the cell, wherein the multiple bandwidth parts indicated are either multiple downlink bandwidth parts or multiple uplink bandwidth parts; and respective frequency positions of multiple synchronization signal blocks, SSBs, for the cell.

A2. The method of embodiment A1, wherein the broadcasted system information indicates the multiple bandwidth parts of the cell.

A3. The method of embodiment A2, wherein the multiple bandwidth parts indicated are each usable by the wireless device to access, or camp on, the cell.

A4. The method of any of embodiments A2-A3, wherein the multiple bandwidth parts indicated are each usable by the wireless device to access, or camp on, the cell from a Radio Resource Control, RRC, idle state or an RRC inactive state.

A5. The method of any of embodiments A2-A4, further comprising accessing, or camping on, the cell using one or more of the multiple bandwidth parts indicated.

A6. The method of embodiment A5, wherein accessing the cell using one or more of the multiple bandwidth parts indicated comprises transmitting or receiving one or more messages of a random access procedure in one or more of the multiple bandwidth parts indicated.

A7. The method of any of embodiments A5-A6, wherein the multiple bandwidth parts indicated are multiple downlink bandwidth parts, and wherein camping on the cell using one or more of the multiple bandwidth parts indicated comprises monitoring a paging channel in one or more of the multiple bandwidth parts indicated.

A8. The method of any of embodiments A5-A7, wherein said accessing, or camping on, the cell using one or more of the multiple bandwidth parts indicated comprises accessing, or camping on, the cell using one or more of the multiple bandwidth parts indicated, from an Radio Resource Control, RRC, idle state or an RRC inactive state.

A9. The method of any of embodiments A1-A8, wherein receiving the broadcasted system information comprises receiving the broadcasted system information in a downlink bandwidth part of the cell.

A10. The method of any of embodiments A2-A9, further comprising selecting, from the multiple bandwidth parts indicated, one or more bandwidth parts to use for accessing, or camping on, the cell.

A11. The method of embodiment A10, wherein said selecting comprises selecting, from the multiple bandwidth parts indicated, one or more bandwidth parts based on an identity which identifies the wireless device or a subscriber associated with the wireless device.

A12. The method of embodiment A11, wherein the multiple bandwidth parts indicated have respective indices, and wherein said selecting comprises selecting a bandwidth part with an index n=ID mod N, where ID is the identity which identifies the wireless device or the subscriber associated with the wireless device, and where N is a number of the multiple bandwidth parts indicated.

A13. The method of embodiment A10, wherein said selecting comprises selecting, from the multiple bandwidth parts indicated, one or more bandwidth parts based on signal measurements performed by the wireless device on signals received in respective ones of the multiple bandwidth parts indicated.

A14. The method of embodiment A10, wherein said selecting comprises randomly selecting one or more bandwidth parts from the multiple bandwidth parts indicated.

A15. The method of embodiment A14, wherein said randomly selecting comprises randomly selecting the one or more bandwidth parts according to a probability distribution indicated by the broadcasted system information.

A16. The method of any of embodiments A2-A15, wherein, for at least one of the multiple bandwidth parts indicated, one portion of configuration parameters for the bandwidth part is indicated by the broadcasted system information and another portion of configuration parameters for the bandwidth part is received by the wireless device on a downlink channel in the bandwidth part.

A17. The method of any of embodiments A2-A16, wherein, for at least one of the multiple bandwidth parts indicated, one portion of configuration parameters for the bandwidth part is either indicated by the broadcasted system information or is received by the wireless device on a downlink channel in the bandwidth part, and another portion of configuration parameters for the bandwidth part is derived by the wireless device from configuration parameters for another bandwidth part.

A18. The method of embodiment A17, wherein the another bandwidth part is a bandwidth part in which the broadcasted system information is received.

A19. The method of any of embodiments A2-A18, wherein the multiple bandwidth parts are each usable by the wireless device to perform one or more operations in a Radio Resource Control, RRC, idle state or an RRC inactive state.

A20. The method of any of embodiments A2-A19, further comprising, while the wireless device is in a Radio Resource Control, RRC, idle state or an RRC inactive state, performing one or more operations using one or more of the multiple bandwidth parts of the cell.

A21. The method of any of embodiments A2-A20, wherein the multiple bandwidth parts indicated are multiple downlink bandwidth parts, and wherein the method comprises selecting, from the multiple downlink bandwidth parts indicated, one or more downlink bandwidth parts to use for accessing, or camping on, the cell, independently of which of one or more uplink bandwidth parts the wireless device uses.

A22. The method of any of any of embodiments A2-A21, wherein the multiple bandwidth parts indicated are multiple uplink bandwidth parts, and wherein the method comprises selecting, from the multiple uplink bandwidth parts indicated, one or more uplink bandwidth parts to use for accessing the cell, independently of which of one or more downlink bandwidth parts the wireless device uses.

A23. The method of any of embodiments A2-A20, wherein the broadcasted system information indicates multiple downlink bandwidth parts and multiple uplink bandwidth parts.

A24. The method of embodiment A23, wherein the broadcasted system information indicates selectable bandwidth part pairs, with each bandwidth part pair including one of the multiple downlink bandwidth parts and one of the multiple uplink bandwidth parts, and wherein the method further comprises selecting one of the selectable bandwidth part pairs to use for accessing, or camping on, the cell.

A25. The method of any of embodiments A1-A24, wherein the broadcasted system information includes a System Information Block 1 (SIB1) that indicates the at least one of any one or more of:

the multiple bandwidth parts of the cell; and the respective frequency positions of multiple SSBs for the cell.

A26. The method of any of embodiments A1-A25, wherein the multiple bandwidth parts of the cell are included within the frequency span of the same carrier.

A27. The method of any of embodiments A1-A26, wherein the cell is uniquely identified in the wireless communication network by a cell global identity.

A28. The method of any of embodiments A1-A27, wherein the wireless communication network is or includes a non-terrestrial network.

A29. The method of any of embodiments A1-A28, wherein the broadcasted system information indicates a first polarization mode for a first bandwidth part of the multiple bandwidth parts of the cell and a second polarization mode for a second bandwidth part of the multiple bandwidth parts of the cell.

A30. The method of any of embodiments A1-A29, wherein communication in a first bandwidth part of the cell is to be performed with a first polarization and communication in a second bandwidth part of the cell is to be performed with a second polarization which is orthogonal to the first polarization.

A31. The method of any of embodiments A1-A30, wherein the broadcasted system information indicates respective frequency positions of multiple SSBs for the cell.

A32. The method of embodiment A31, further comprising determining, based on the one or more respective positions of one or more of the multiple SSBs for the cell, radio resources on which to receive a data channel of the cell and receiving the data channel on radio resources according to said determining.

A33. The method of any of embodiments A1-A32, wherein either:

the broadcasted system information indicates, for each of one or more of the multiple BWPs of the cell, a physical cell identity conveyed by an SSB transmitted within that BWP; or the broadcasted system information indicates, for each of one or more of the multiple SSBs for the cell, a physical cell identity conveyed by the SSB.

A34. The method of any of embodiments A1-A33, wherein at least two of the multiple SSBs for the cell are cell-defining SSBs.

AA. The method of any of the previous embodiments, further comprising:

providing user data; and forwarding the user data to a host computer via the transmission to a base station.

Group B Embodiments

B1. A method performed by a radio network node configured for use in a wireless communication network, the method comprising:

broadcasting system information for a cell, the broadcasted system information indicating at least one of any one or more of:

multiple bandwidth parts of the cell, wherein the multiple bandwidth parts indicated are either multiple downlink bandwidth parts or multiple uplink bandwidth parts; and respective frequency positions of multiple synchronization signal blocks, SSBs, for the cell.

B2. The method of embodiment B1, wherein the broadcasted system information indicates the multiple bandwidth parts of the cell.

B3. The method of embodiment B2, wherein the multiple bandwidth parts indicated are each usable by a wireless device to access, or camp on, the cell.

B4. The method of any of embodiments B2-B3, wherein the multiple bandwidth parts indicated are each usable by a wireless device to access, or camp on, the cell from a Radio Resource Control, RRC, idle state or an RRC inactive state.

B5. The method of any of embodiments B2-B4, further comprising using one or more of the multiple bandwidth parts indicated to serve a wireless device.

B6. The method of any of embodiments B2-B5, further comprising transmitting or receiving one or more messages of a random access procedure in one or more of the multiple bandwidth parts indicated.

B7. The method of any of embodiments B2-B6, wherein the multiple bandwidth parts indicated are multiple downlink bandwidth parts, and wherein the method further comprises paging the same wireless device within each of the multiple bandwidth parts indicated.

B8. The method of any of embodiments B2-B7, further comprising using one or more of the multiple bandwidth parts indicated to serve a wireless device while the wireless device is in a Radio Resource Control, RRC, idle state or an RRC inactive state.

B9. The method of any of embodiments B1-B8, wherein broadcasting the system information comprises broadcasting the system information in a downlink bandwidth part of the cell.

B10. The method of any of embodiments B2-B9, wherein the system information indicates a probability distribution according to which the wireless device is to randomly select, from the multiple bandwidth parts indicated, one or more bandwidth parts to use for accessing, or camping on, the cell.

B11. The method of any of embodiments B2-B10, wherein, for at least one of the multiple bandwidth parts indicated, one portion of configuration parameters for the bandwidth part is indicated by the broadcasted system information and another portion of configuration parameters for the bandwidth part is transmitted on a downlink channel in the bandwidth part.

B12. The method of any of embodiments B2-B11, wherein, for at least one of the multiple bandwidth parts indicated, one portion of configuration parameters for the bandwidth part is either indicated by the broadcasted system information or is transmitted on a downlink channel in the bandwidth part, and another portion of configuration parameters for the bandwidth part is derivable from configuration parameters for another bandwidth part.

B13. The method of embodiment B12, wherein the another bandwidth part is a bandwidth part in which the broadcasted system information is transmitted.

B14. The method of any of embodiments B2-B13, wherein the multiple bandwidth parts are each usable by a wireless device to perform one or more operations in a Radio Resource Control, RRC, idle state or an RRC inactive state.

B15. The method of any of embodiments B2-B14, wherein the broadcasted system information indicates multiple downlink bandwidth parts and multiple uplink bandwidth parts.

B16. The method of embodiment B15, wherein the broadcasted system information indicates selectable bandwidth part pairs, with each bandwidth part pair including one of the multiple downlink bandwidth parts and one of the multiple uplink bandwidth parts.

B17. The method of any of embodiments B1-B16, wherein the broadcasted system information includes a System Information Block 1 (SIB1) that indicates the at least one of any one or more of:

the multiple bandwidth parts of the cell; and
the respective frequency positions of multiple SSBs for the cell.

B18. The method of any of embodiments B1-B17, wherein the multiple bandwidth parts of the cell are included within the frequency span of the same carrier.

B19. The method of any of embodiments B1-B18, wherein the cell is uniquely identified in the wireless communication network by a cell global identity.

B20. The method of any of embodiments B1-B19, wherein the wireless communication network is or includes a non-terrestrial network.

B21. The method of any of embodiments B1-B20, wherein the broadcasted system information indicates a first polarization mode for a first bandwidth part of the multiple bandwidth parts of the cell and a second polarization mode for a second bandwidth part of the multiple bandwidth parts of the cell.

B22. The method of any of embodiments B1-B21, wherein communication in a first bandwidth part of the cell is to be performed with a first polarization and communication in a second bandwidth part of the cell is to be performed with a second polarization which is orthogonal to the first polarization.

B23. The method of any of embodiments B1-B22, wherein the broadcasted system information indicates respective frequency positions of multiple SSBs for the cell.

B24. The method of embodiment B23, further comprising mapping a data channel of the cell onto radio resources in dependence on one or more respective frequency positions of one or more of the multiple SSBs for the cell, and transmitting the data channel on radio resources according to said mapping.

B25. The method of any of embodiments B2-B24, wherein the multiple bandwidth parts indicated are multiple uplink bandwidth parts, and wherein the method further comprising monitoring each of two or more of the multiple uplink bandwidth parts for a random access preamble from a wireless device.

B26. The method of embodiment B25, further comprising:

determining, from the uplink bandwidth part within which a random access preamble is received from a wireless device, a downlink bandwidth part within which to transmit a response to the random access preamble; and
transmitting a response to the random access preamble within the determined downlink bandwidth part.

B27. The method of any of embodiments B2-B26, further comprising determining, from the multiple bandwidth parts indicated, a bandwidth part that a wireless device is to use for accessing, or camping on, the cell.

B28. The method of embodiment B27, wherein said determining is performed based on an identity which identifies the wireless device or a subscriber associated with the wireless device.

B29. The method of embodiment B28, wherein the multiple bandwidth parts indicated have respective indices, and wherein said determining comprises determining the bandwidth part that the wireless device is to use as being a bandwidth part with an index $n=ID \bmod N$, where ID is the identity which identifies the wireless device or the subscriber associated with the wireless device, and where N is a number of the multiple bandwidth parts indicated.

B30. The method of any of embodiments B27-B29, wherein the multiple bandwidth parts indicated are multiple downlink bandwidth parts, wherein said determining comprises determining, from the multiple downlink bandwidth parts, a downlink bandwidth part that the wireless device is to use for camping on the cell, and wherein the method further comprises paging the wireless device within the determined downlink bandwidth part.

B31. The method of any of embodiments B1-B30, wherein either:

the broadcasted system information indicates, for each of one or more of the multiple BWPs of the cell, a physical cell identity conveyed by an SSB transmitted within that BWP; or
the broadcasted system information indicates, for each of one or more of the multiple SSBs for the cell, a physical cell identity conveyed by the SSB.

B32. The method of any of embodiments B1-B31, wherein at least two of the multiple SSBs for the cell are cell-defining SSBs.

BB1. A method performed by a radio network node configured for use in a wireless communication network, the method comprising:

broadcasting multiple system information blocks that each indicate system information for the same cell and that each define scheduling of other system information blocks.

BB2. The method of embodiment BB1, wherein the multiple system information blocks are broadcasted at different frequency positions within the same carrier.

BB3. The method of any of embodiments BB1-BB2, further comprising transmitting synchronization signal blocks (SSBs) associated with respective ones of the multiple system information blocks broadcasted.

BB4. The method of any of embodiments BB1-BB3, further comprising transmitting synchronization signal blocks (SSBs) that indicate parameters for receiving respective ones of the multiple system information blocks broadcasted.

BB5. The method of any of embodiments BB1-BB4, further comprising transmitting synchronization signal blocks (SSBs) that indicate control resource sets for receiving respective ones of the multiple system information blocks broadcasted.

BB6. The method of any of embodiments BB1-BB5, wherein at least two or more of the multiple system information blocks are broadcasted in different downlink bandwidth parts of the cell.

BB7. The method of embodiment BB6, further comprising performing, in each of the different downlink bandwidth parts of the cell, random access procedures for wireless devices to access the cell from a Radio Resource Control, RRC, idle state or an RRC inactive state.

BB8. The method of any of embodiments BB6-BB7, further comprising transmitting, in each of the different downlink bandwidth parts of the cell, paging messages to wireless devices in a Radio Resource Control, RRC, idle state or an RRC inactive state.

BB9. The method of any of embodiments BB6-BB8, wherein the different downlink bandwidth parts are each usable by wireless devices to access, or camp on, the cell.

BB10. The method of any of embodiments BB6-BB9, wherein the different downlink bandwidth parts of the cell are included within the frequency span of the same carrier.

BB11. The method of any of embodiments BB1-BB10, wherein the system information blocks broadcasted are each a System Information Block 1 (SIB1).

BB12. The method of any of embodiments BB1-BB11, wherein the cell is uniquely identified in a wireless communication network by a cell global identity such that the system information blocks broadcasted are associated with the same cell global identity.

BB13. The method of embodiment BB12, wherein the cell global identity is mapped to multiple different non-unique physical cell identities.

BB14. The method of any of embodiments BB1-BB13, wherein the wireless communication network is or includes a non-terrestrial network.

BB15. A method performed by a radio network node configured for use in a wireless communication network, the method comprising:

transmitting multiple synchronization signal blocks (SSBs) associated with respective ones of multiple system information blocks broadcasted for the same cell, wherein each of the multiple system information blocks indicates system information for the same cell and defines scheduling of other system information blocks.

BB16. A method performed by a radio network node configured for use in a wireless communication network, the method comprising:

transmitting multiple synchronization signal blocks (SSBs) that indicate respective control resource sets used to schedule respective ones of multiple system information blocks broadcasted for the same cell, wherein each of the multiple system information blocks indicates system information for the same cell and defines scheduling of other system information blocks.

BB17. A method performed by a radio network node configured for use in a wireless communication network, the method comprising:

transmitting multiple cell-defining synchronization signal blocks (CD-SSBs) for the same cell.

BB. The method of any of the previous embodiments, further comprising:

obtaining user data; and forwarding the user data to a host computer or a wireless device.

Group C Embodiments

C1. A wireless device configured to perform any of the steps of any of the Group A embodiments.

C2. A wireless device comprising processing circuitry configured to perform any of the steps of any of the Group A embodiments.

C3. A wireless device comprising:

communication circuitry; and processing circuitry configured to perform any of the steps of any of the Group A embodiments.

C4. A wireless device comprising:

processing circuitry configured to perform any of the steps of any of the Group A embodiments; and power supply circuitry configured to supply power to the wireless device.

C5. A wireless device comprising:

processing circuitry and memory, the memory containing instructions executable by the processing circuitry whereby the wireless device is configured to perform any of the steps of any of the Group A embodiments.

C6. A user equipment (UE) comprising:

an antenna configured to send and receive wireless signals;

radio front-end circuitry connected to the antenna and to processing circuitry, and configured to condition signals communicated between the antenna and the processing circuitry;

the processing circuitry being configured to perform any of the steps of any of the Group A embodiments;

an input interface connected to the processing circuitry and configured to allow input of information into the UE to be processed by the processing circuitry;

an output interface connected to the processing circuitry and configured to output information from the UE that has been processed by the processing circuitry; and a battery connected to the processing circuitry and configured to supply power to the UE.

C7. A computer program comprising instructions which, when executed by at least one processor of a wireless device, causes the wireless device to carry out the steps of any of the Group A embodiments.

C8. A carrier containing the computer program of embodiment C7, wherein the carrier is one of an electronic signal, optical signal, radio signal, or computer readable storage medium.

C9. A radio network node configured to perform any of the steps of any of the Group B embodiments.

C10. A radio network node comprising processing circuitry configured to perform any of the steps of any of the Group B embodiments.

C11. A radio network node comprising:

communication circuitry; and processing circuitry configured to perform any of the steps of any of the Group B embodiments.

C12. A radio network node comprising:

processing circuitry configured to perform any of the steps of any of the Group B embodiments;

power supply circuitry configured to supply power to the radio network node.

C13. A radio network node comprising:

processing circuitry and memory, the memory containing instructions executable by the processing circuitry whereby the radio network node is configured to perform any of the steps of any of the Group B embodiments.

C14. The radio network node of any of embodiments C9-C13, wherein the radio network node is a base station.

C15. A computer program comprising instructions which, when executed by at least one processor of a radio network node, causes the radio network node to carry out the steps of any of the Group B embodiments.

C16. The computer program of embodiment C14, wherein the radio network node is a base station.

C17. A carrier containing the computer program of any of embodiments C15-C16, wherein the carrier is one of an electronic signal, optical signal, radio signal, or computer readable storage medium.

Group D Embodiments

D1. A communication system including a host computer comprising:
  processing circuitry configured to provide user data; and
  a communication interface configured to forward the user data to a cellular network for transmission to a user equipment (UE),
  wherein the cellular network comprises a base station having a radio interface and processing circuitry, the base station's processing circuitry configured to perform any of the steps of any of the Group B embodiments.

D2. The communication system of the previous embodiment further including the base station.

D3. The communication system of the previous 2 embodiments, further including the UE, wherein the UE is configured to communicate with the base station.

D4. The communication system of the previous 3 embodiments, wherein:
  the processing circuitry of the host computer is configured to execute a host application, thereby providing the user data; and
  the UE comprises processing circuitry configured to execute a client application associated with the host application.

D5. A method implemented in a communication system including a host computer, a base station and a user equipment (UE), the method comprising:
  at the host computer, providing user data; and
    at the host computer, initiating a transmission carrying the user data to the UE via a cellular network comprising the base station, wherein the base station performs any of the steps of any of the Group B embodiments.

D6. The method of the previous embodiment, further comprising, at the base station, transmitting the user data.

D7. The method of the previous 2 embodiments, wherein the user data is provided at the host computer by executing a host application, the method further comprising, at the UE, executing a client application associated with the host application.

D8. A user equipment (UE) configured to communicate with a base station, the UE comprising a radio interface and processing circuitry configured to perform any of the previous 3 embodiments.

D9. A communication system including a host computer comprising:
  processing circuitry configured to provide user data; and
  a communication interface configured to forward user data to a cellular network for transmission to a user equipment (UE),
  wherein the UE comprises a radio interface and processing circuitry, the UE's components configured to perform any of the steps of any of the Group A embodiments.

D10. The communication system of the previous embodiment, wherein the cellular network further includes a base station configured to communicate with the UE.

D11. The communication system of the previous 2 embodiments, wherein:
  the processing circuitry of the host computer is configured to execute a host application, thereby providing the user data; and
  the UE's processing circuitry is configured to execute a client application associated with the host application.

D12. A method implemented in a communication system including a host computer, a base station and a user equipment (UE), the method comprising:
  at the host computer, providing user data; and
  at the host computer, initiating a transmission carrying the user data to the UE via a cellular network comprising the base station, wherein the UE performs any of the steps of any of the Group A embodiments.

D13. The method of the previous embodiment, further comprising at the UE, receiving the user data from the base station.

D14. A communication system including a host computer comprising:
  communication interface configured to receive user data originating from a transmission from a user equipment (UE) to a base station,
  wherein the UE comprises a radio interface and processing circuitry, the UE's processing circuitry configured to perform any of the steps of any of the Group A embodiments.

D15. The communication system of the previous embodiment, further including the UE.

D16. The communication system of the previous 2 embodiments, further including the base station, wherein the base station comprises a radio interface configured to communicate with the UE and a communication interface configured to forward to the host computer the user data carried by a transmission from the UE to the base station.

D17. The communication system of the previous 3 embodiments, wherein:
  the processing circuitry of the host computer is configured to execute a host application; and
  the UE's processing circuitry is configured to execute a client application associated with the host application, thereby providing the user data.

D18. The communication system of the previous 4 embodiments, wherein:
  the processing circuitry of the host computer is configured to execute a host application, thereby providing request data; and
  the UE's processing circuitry is configured to execute a client application associated with the host application, thereby providing the user data in response to the request data.

D19. A method implemented in a communication system including a host computer, a base station and a user equipment (UE), the method comprising:
  at the host computer, receiving user data transmitted to the base station from the UE, wherein the UE performs any of the steps of any of the Group A embodiments.

D20. The method of the previous embodiment, further comprising, at the UE, providing the user data to the base station.

D21. The method of the previous 2 embodiments, further comprising:
  at the UE, executing a client application, thereby providing the user data to be transmitted; and
  at the host computer, executing a host application associated with the client application.

D22. The method of the previous 3 embodiments, further comprising:

at the UE, executing a client application; and at the UE, receiving input data to the client application, the input data being provided at the host computer by executing a host application associated with the client application, wherein the user data to be transmitted is provided by the client application in response to the input data.

D23. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B embodiments.

D24. The communication system of the previous embodiment further including the base station.

D25. The communication system of the previous 2 embodiments, further including the UE, wherein the UE is configured to communicate with the base station.

D26. The communication system of the previous 3 embodiments, wherein:

the processing circuitry of the host computer is configured to execute a host application;

the UE is configured to execute a client application associated with the host application, thereby providing the user data to be received by the host computer.

D27. A method implemented in a communication system including a host computer, a base station and a user equipment (UE), the method comprising:

at the host computer, receiving, from the base station, user data originating from a transmission which the base station has received from the UE, wherein the UE performs any of the steps of any of the Group A embodiments.

D28. The method of the previous embodiment, further comprising at the base station, receiving the user data from the UE.

D29. The method of the previous 2 embodiments, further comprising at the base station, initiating a transmission of the received user data to the host computer.

What is claimed is:

1. A method performed by a wireless device configured for use in a wireless communication network, the method comprising, while the wireless device is in a Radio Resource Control (RRC) idle state or an RRC inactive state:

receiving broadcasted system information for a cell of the wireless communication network, the broadcasted system information comprising a System Information Block 1 (SIB1) indicating multiple downlink bandwidth parts of the cell that are each usable by the wireless device to camp on the cell;

performing signal measurements on one or more downlink signals received in respective ones of the indicated multiple downlink bandwidth parts;

selecting one of the indicated multiple downlink bandwidth parts as a selected downlink bandwidth part, the selecting based on comparing the signal measurements for the respective ones of the indicated multiple downlink bandwidth parts; and camping on the cell using the selected downlink bandwidth part by performing a cell selection or reselection to the cell and subsequently monitoring a paging channel in the selected downlink bandwidth part;

wherein the indicated multiple downlink bandwidth parts have correspondingly paired uplink bandwidth parts, and wherein the method further comprises selecting the uplink bandwidth part that is correspondingly paired with the selected downlink bandwidth part.

2. The method of claim 1, wherein selecting one of the indicated multiple downlink bandwidth parts comprises selecting, from among the respective ones of the indicated multiple downlink bandwidth parts, the indicated downlink bandwidth part corresponding to a highest received signal power, as determined from the signal measurements made for the respective ones of the indicated multiple downlink bandwidth parts.

3. A wireless device configured for use in a wireless communication network, the wireless device comprising:

communication circuitry; and processing circuitry configured to, while the wireless device is in a Radio Resource Control (RRC) idle state or an RRC inactive state:

receive, via the communication circuitry, broadcasted system information for a cell of the wireless communication network, the broadcasted system information comprising a System Information Block 1 (SIB1) indicating multiple downlink bandwidth parts of the cell that are each usable by the wireless device to camp on the cell;

perform signal measurements on one or more downlink signals received in respective ones of the indicated multiple downlink bandwidth parts;

select one of the indicated multiple downlink bandwidth parts as a selected downlink bandwidth part, the selecting based on comparing the signal measurements for the respective ones of the indicated multiple downlink bandwidth parts; and camp on the cell using the selected downlink bandwidth part by performing a cell selection or reselection to the cell and subsequently monitoring a paging channel in the selected downlink bandwidth part;

wherein the indicated multiple downlink bandwidth parts have correspondingly paired uplink bandwidth parts, and wherein the method further comprises selecting the uplink bandwidth part that is correspondingly paired with the selected downlink bandwidth part.

* * * * *